(12) United States Patent
Xu et al.

(10) Patent No.: US 12,445,614 B2
(45) Date of Patent: Oct. 14, 2025

(54) ADAPTIVE CONTEXT-BASED ADAPTIVE BINARY ARITHMETIC CODING (CABAC) INITIAL STATE SELECTION FROM CODED PICTURES

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 102 days.

(21) Appl. No.: 17/985,809

(22) Filed: Nov. 11, 2022

(65) Prior Publication Data
US 2023/0254489 A1 Aug. 10, 2023

Related U.S. Application Data

(60) Provisional application No. 63/307,522, filed on Feb. 7, 2022.

(51) Int. Cl.
| | |
|---|---|
| *H04N 19/13* | (2014.01) |
| *H04N 19/105* | (2014.01) |
| *H04N 19/169* | (2014.01) |
| *H04N 19/172* | (2014.01) |
| *H04N 19/70* | (2014.01) |
| *H04N 19/91* | (2014.01) |

(52) U.S. Cl.
CPC ........... *H04N 19/13* (2014.11); *H04N 19/105* (2014.11); *H04N 19/172* (2014.11);
(Continued)

(58) Field of Classification Search
CPC .... H04N 19/13; H04N 19/105; H04N 19/172; H04N 19/1883; H04N 19/70;
(Continued)

(56) References Cited

U.S. PATENT DOCUMENTS

| | | | |
|---|---|---|---|
| 9,379,736 B2* | 6/2016 | Sole Rojals | ......... H04N 19/196 |
| 11,218,737 B2* | 1/2022 | Han | ....................... H04N 19/91 |

(Continued)

OTHER PUBLICATIONS

International Search Report and Written Opinion issued in International Application No. PCT/US2022/079802 mailed Feb. 8, 2023, 15 pages.

(Continued)

*Primary Examiner* — Susan E. Hodges
(74) *Attorney, Agent, or Firm* — ArentFox Schiff LLP

(57) ABSTRACT

A method and an apparatus including processing circuitry are provided. The processing circuitry determines previous probability information associated with each entropy coded region of multiple regions in a previous picture. The processing circuitry selects, based on (i) a location or a quantization parameter of an independently decodable coding segment in a current picture or (ii) syntax information of the independently decodable coding segment, a region among the multiple regions. Initial probability information for one or more current syntax elements of a block in the independently decodable coding segment is determined based on the previous probability information associated with the selected region. The one or more current syntax elements are first to be entropy decoded in the independently decodable coding segment. The processing circuitry entropy decodes coded bits associated with the one or more current syntax elements into a bin string based on the initial probability information.

12 Claims, 21 Drawing Sheets

(52) U.S. Cl.
CPC ......... *H04N 19/1883* (2014.11); *H04N 19/70* (2014.11); *H04N 19/91* (2014.11)

(58) Field of Classification Search
CPC .... H04N 19/91; H04N 19/157; H04N 19/167; H04N 19/184; H04N 19/124
USPC ......................................................... 375/240
See application file for complete search history.

(56) References Cited

U.S. PATENT DOCUMENTS

| | | | |
|---|---|---|---|
| 2008/0001796 A1* | 1/2008 | Oshikiri | H04N 19/61 375/E7.176 |
| 2014/0301464 A1 | 10/2014 | Wu et al. | |
| 2016/0353108 A1 | 12/2016 | Zhang et al. | |
| 2020/0195959 A1* | 6/2020 | Zhang | H04N 19/159 |
| 2020/0213606 A1 | 7/2020 | Li et al. | |
| 2020/0267399 A1 | 8/2020 | Kwon et al. | |
| 2020/0296378 A1 | 9/2020 | Pong et al. | |
| 2021/0243446 A1 | 8/2021 | George et al. | |
| 2021/0266555 A1 | 8/2021 | Chuang et al. | |

OTHER PUBLICATIONS

Amir Said et al., CE5: CABAC probability initialization from previous inter frames (test C1), Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0379-v1, pp. 1-4.

* cited by examiner

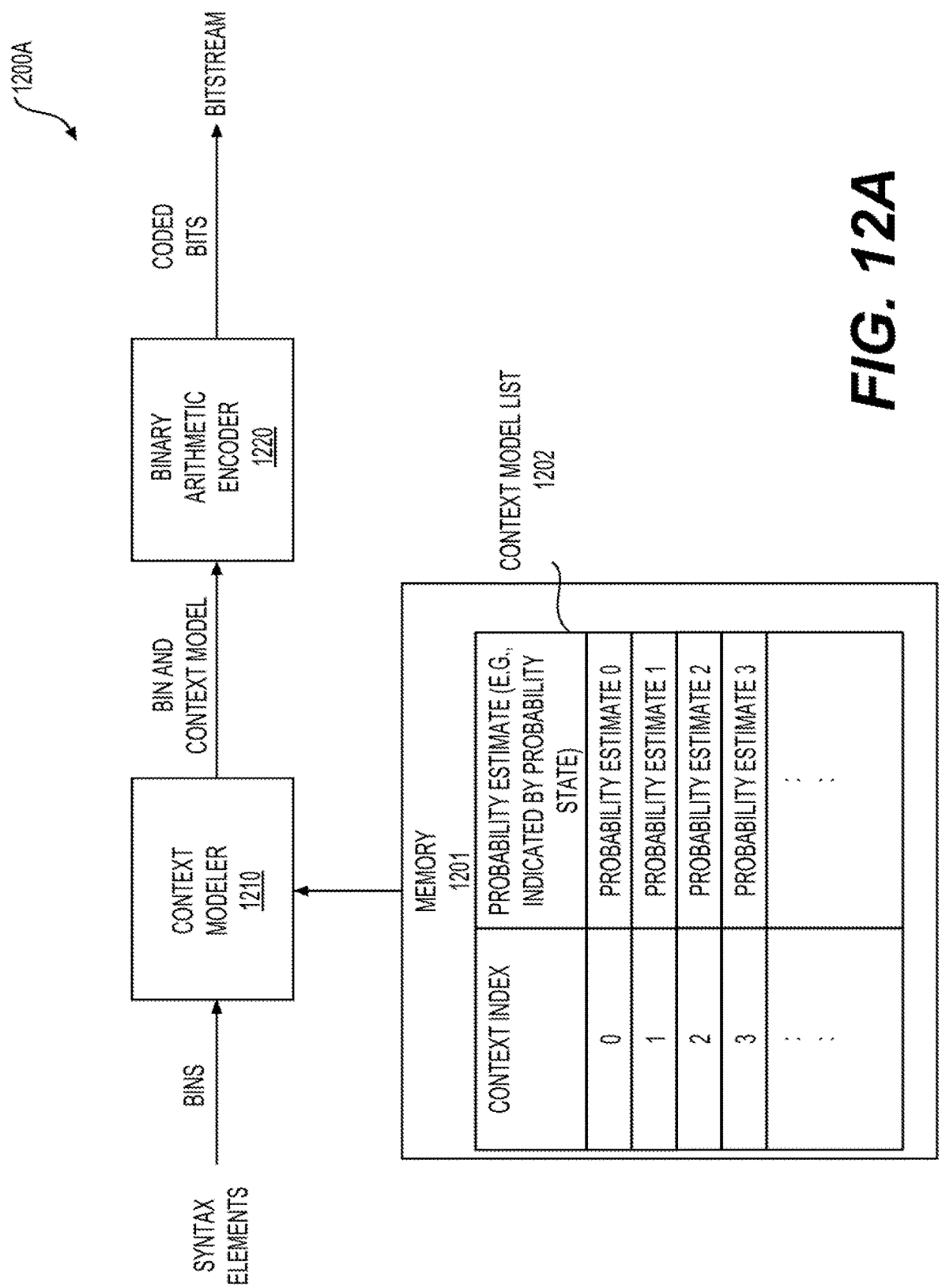

ADAPTIVE CONTEXT-BASED ADAPTIVE BINARY ARITHMETIC CODING (CABAC) INITIAL STATE SELECTION FROM CODED PICTURES

INCORPORATION BY REFERENCE

The present application claims the benefit of priority to U.S. Provisional Application No. 63/307,522, "ADAPTIVE CABAC INITIAL STATE SELECTION FROM CODED PICTURES" filed on Feb. 7, 2022, which is incorporated by reference herein in its entirety.

TECHNICAL FIELD

The present application describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video and/or image encoding/decoding. In some examples, an apparatus for video/image decoding includes processing circuitry. The processing circuitry receives a bitstream including a current picture and a previous picture. The previous picture comprises multiple regions, and each region of the multiple regions is entropy coded. The processing circuitry determines previous probability information associated with each entropy coded region of the multiple regions. The processing circuitry selects, based on (i) a location or a quantization parameter of an independently decodable coding segment in the current picture or (ii) syntax information of the independently decodable coding segment, a region among the multiple regions in the previous picture, the independently decodable coding segment being (i) the current picture or (ii) a region inside the current picture. The processing circuitry determines initial probability information for entropy decoding one or more current syntax elements of a block in the independently decodable coding segment based on the determined previous probability information associated with entropy decoding the selected region. In an example, the one or more current syntax elements are first to be entropy decoded among syntax elements in the independently decodable coding segment. The processing circuitry entropy decodes coded bits associated with the one or more current syntax elements into a bin string associated with the one or more current syntax elements based on the initial probability information and a probability estimation model for the coded bits.

In an embodiment, the multiple regions in the previous picture include coding tree units (CTUs) located at four corners and a center of the previous picture, respectively. The current picture includes four corner regions and a center region. The processing circuitry selects a CTU located at one of the four corners of the previous picture based on the block being located at one of the four corner regions of the current picture. The CTU located at the one of the four corners can be in the selected region. The processing circuitry selects a CTU located at the center of the previous picture based on the block being located at the center region in the current picture. The CTU located at the center can be in the selected region.

In an example, the independently decodable coding segment is one of an intra slice (I-slice), a bi-predictive slice (a B-slice), and a predictive slice (a P-slice) in the current picture.

In an example, the independently decodable coding segment is the current picture. The processing circuitry selects the region based on the syntax information that indicates which region among the multiple regions is selected.

In an example, the syntax information includes an index indicating which region among the multiple regions is selected. The processing circuitry selects the region based on the index.

In an example, the processing circuitry obtains one or more parameters in the probability estimation model based on a probability estimation model used to entropy decode the selected region.

In an example, the one or more parameters include adaptation rates and adaptive weights associated with multiple probability estimates of the bin string. Each of the adaptation rates associated with a respective probability estimate indicates a quantization step size between two adjacent probabilities for the bin string.

In an example, the processing circuitry selects the previous picture from multiple pictures in the bitstream such that a first level in a hierarchical temporal structure associated with the previous picture is lower than a second level in the hierarchical temporal structure associated with the current picture. Each picture at the first level has been decoded prior to decoding each of one or more pictures at the second level.

In an example, the processing circuitry stores the determined previous probability information with a first quantization precision that is lower than a second quantization precision of the determined previous probability information used to entropy decode each region in the previous picture. The processing circuitry determines the initial probability information based on the stored determined previous probability information with the first quantization precision.

In an example, a flag in the bitstream indicates that the initial probability information is to be determined based on the determined previous probability information from the previous picture.

In an example, the probability estimation model is a context-adaptive model. The processing circuitry entropy decodes the coded bits with context-adaptive binary arithmetic coding (CABAC).

Aspects of the disclosure also provide a non-transitory computer-readable medium storing instructions which when executed by a computer for video/image decoding cause the computer to perform the methods for video/image decoding.

BRIEF DESCRIPTION OF THE DRAWINGS

Further features, the nature, and various advantages of the disclosed subject matter will be more apparent from the following detailed description and the accompanying drawings in which:

FIG. 12A shows an exemplary context-based adaptive binary arithmetic coding (CABAC) based entropy encoder in accordance with an embodiment.

DETAILED DESCRIPTION OF EMBODIMENTS

Figure 1A:
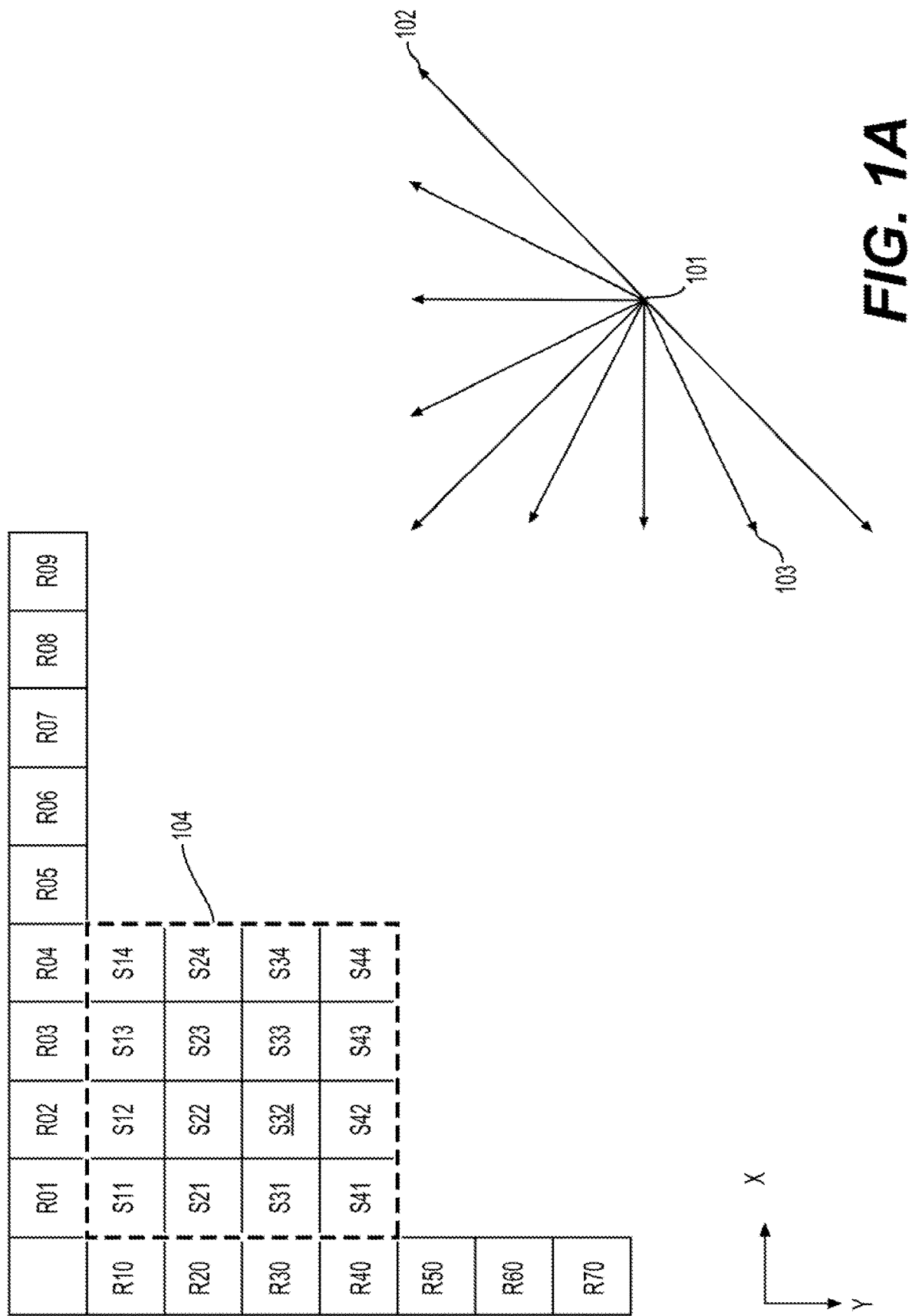
FIG. 1A is a schematic illustration of an exemplary subset of intra prediction modes.
Figure 1B:
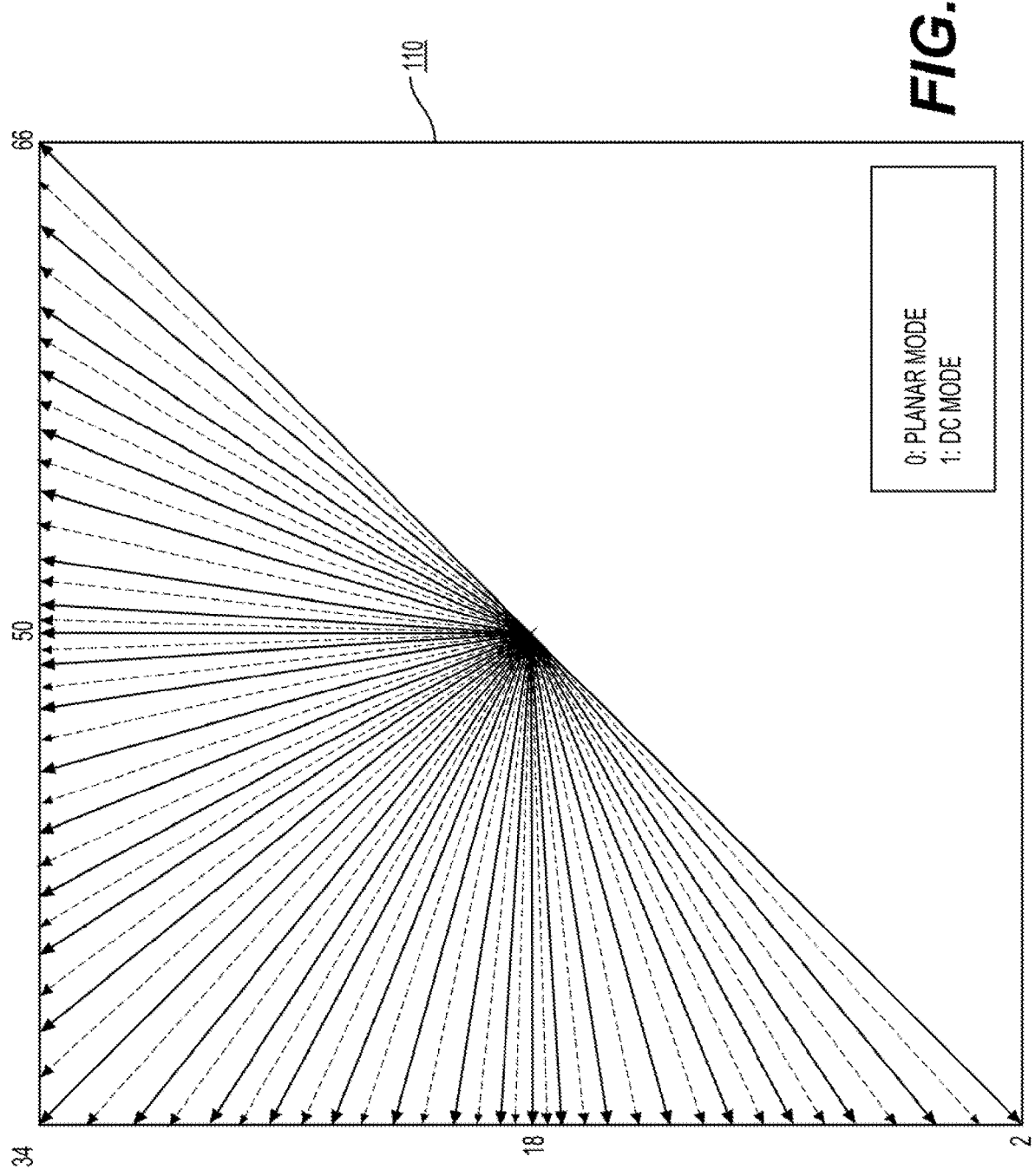
FIG. 1B is an illustration of exemplary intra prediction directions.
Figure 2:
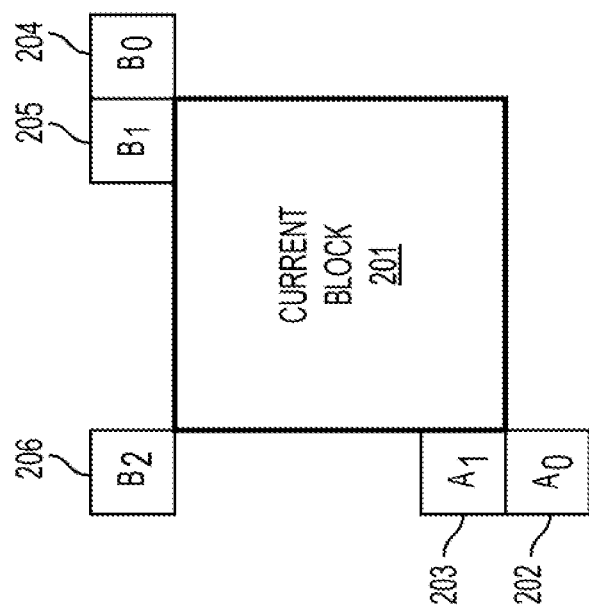
FIG. 2 shows an example of a current block (201) and surrounding samples.
Figure 3:
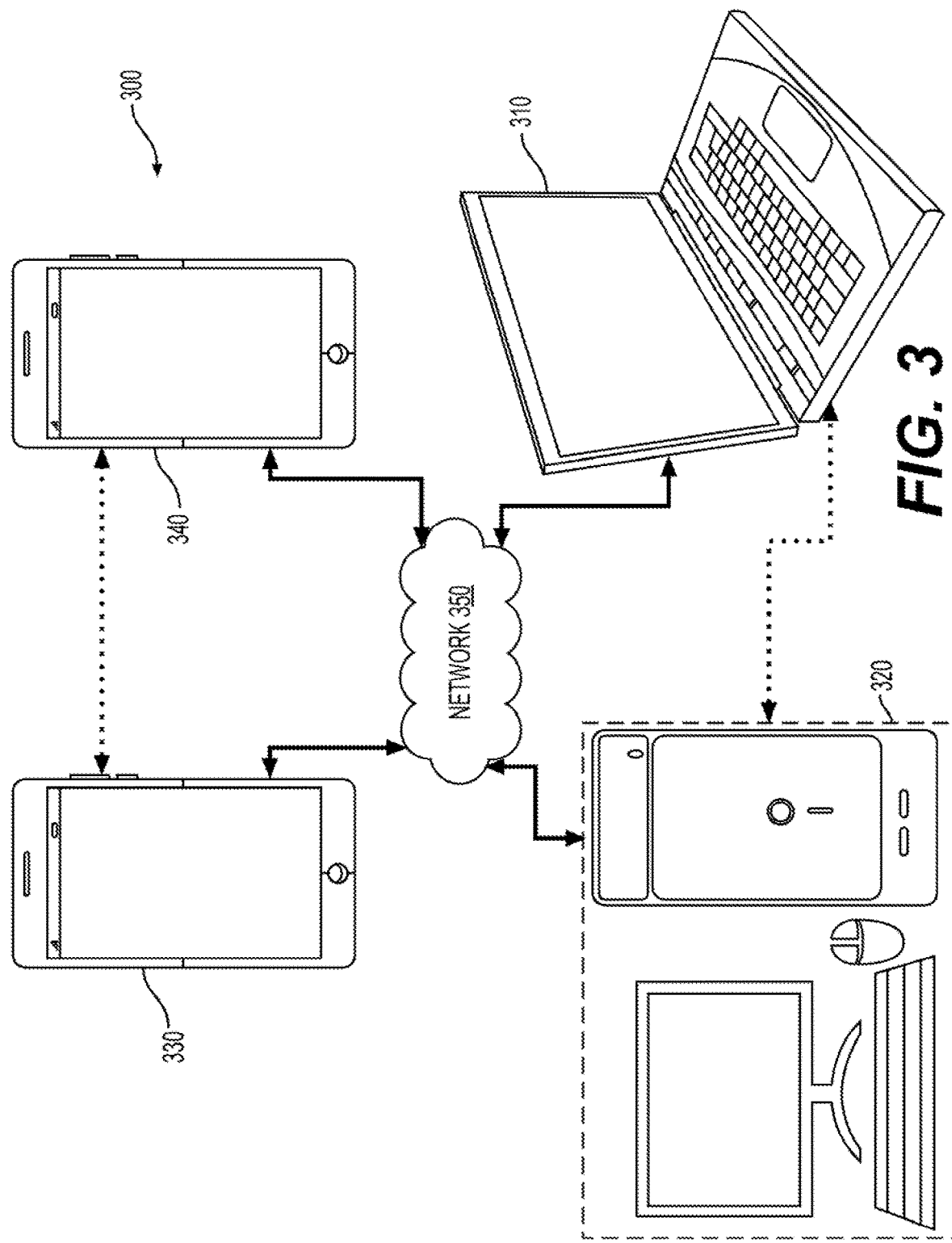
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
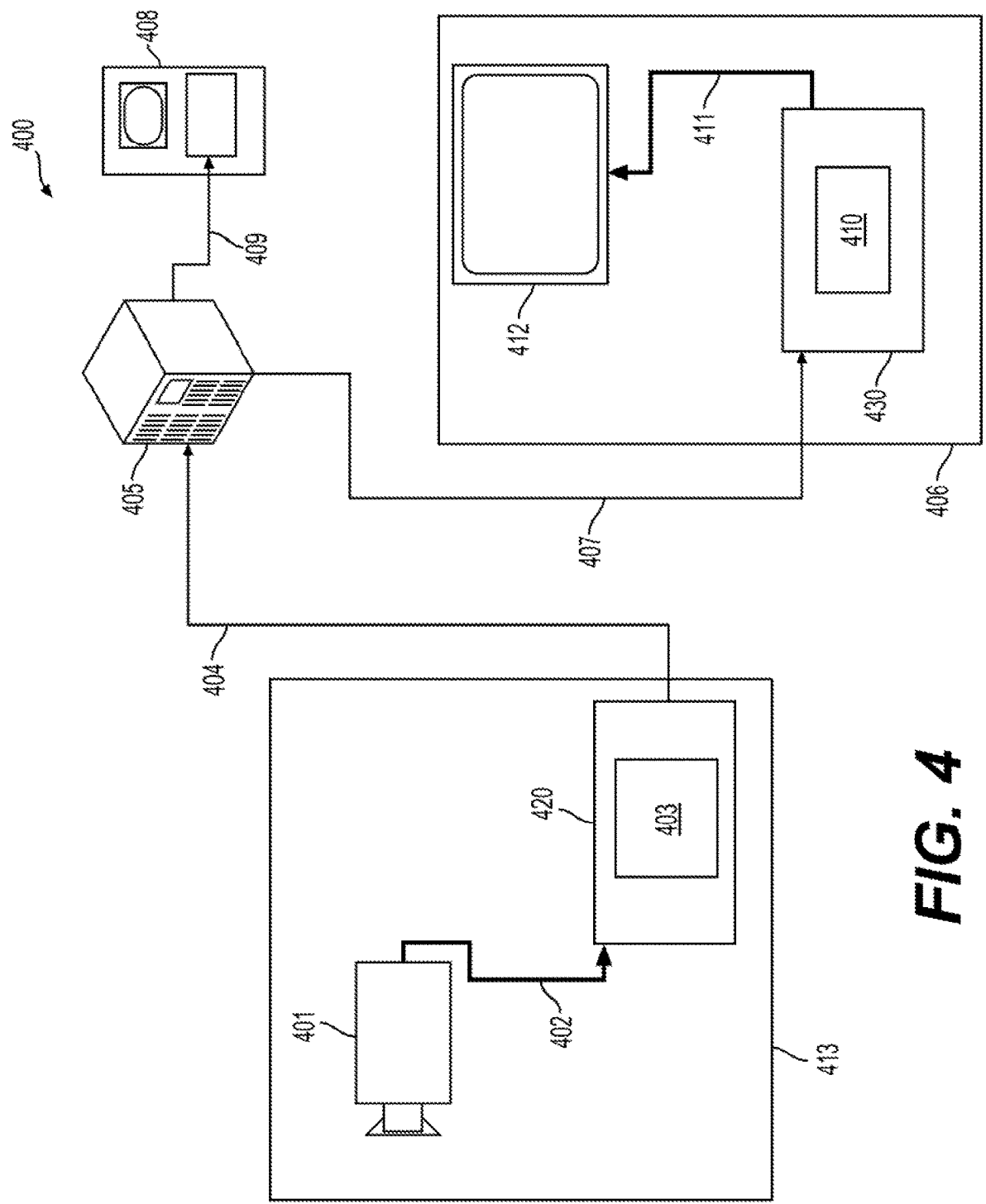
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
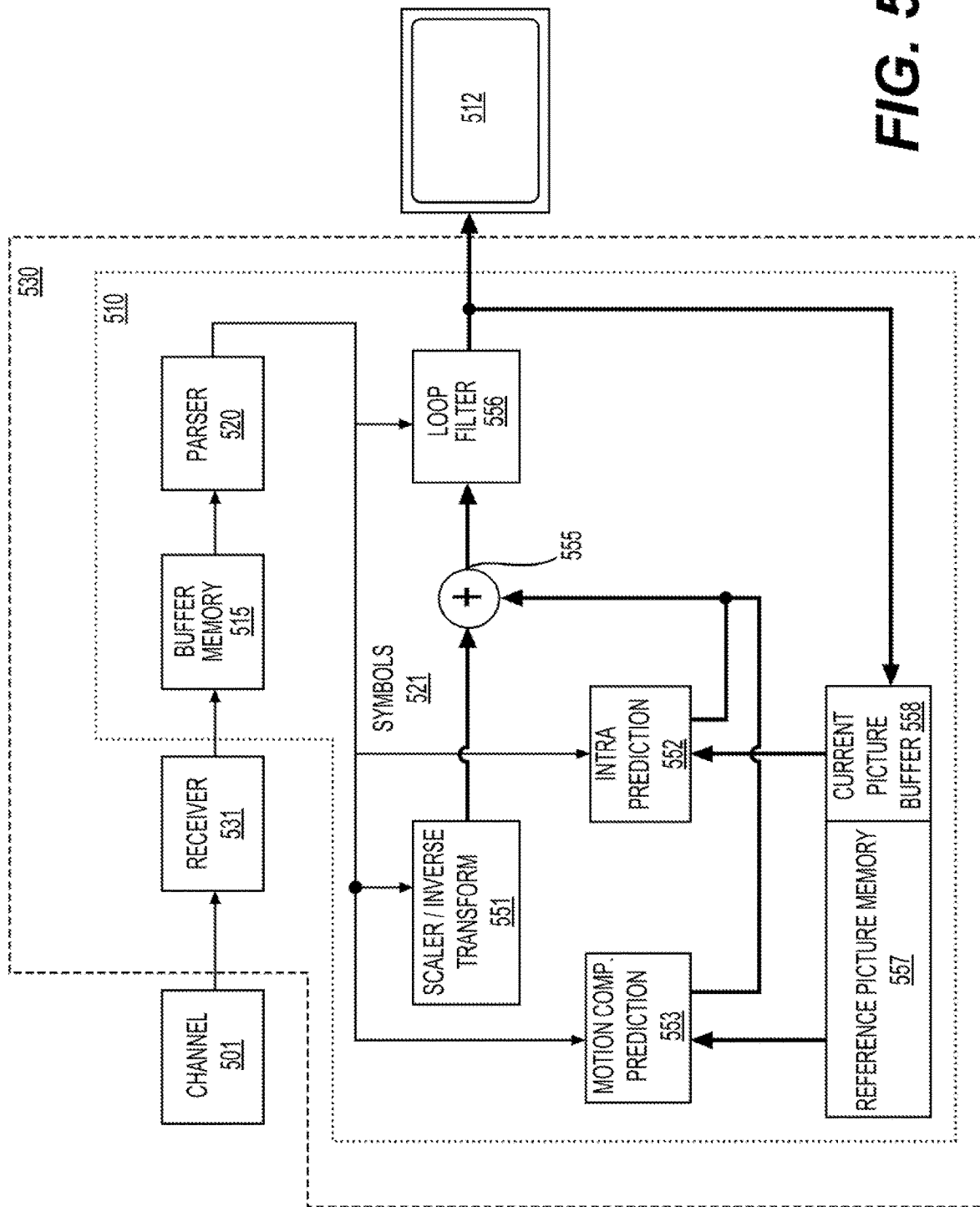
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
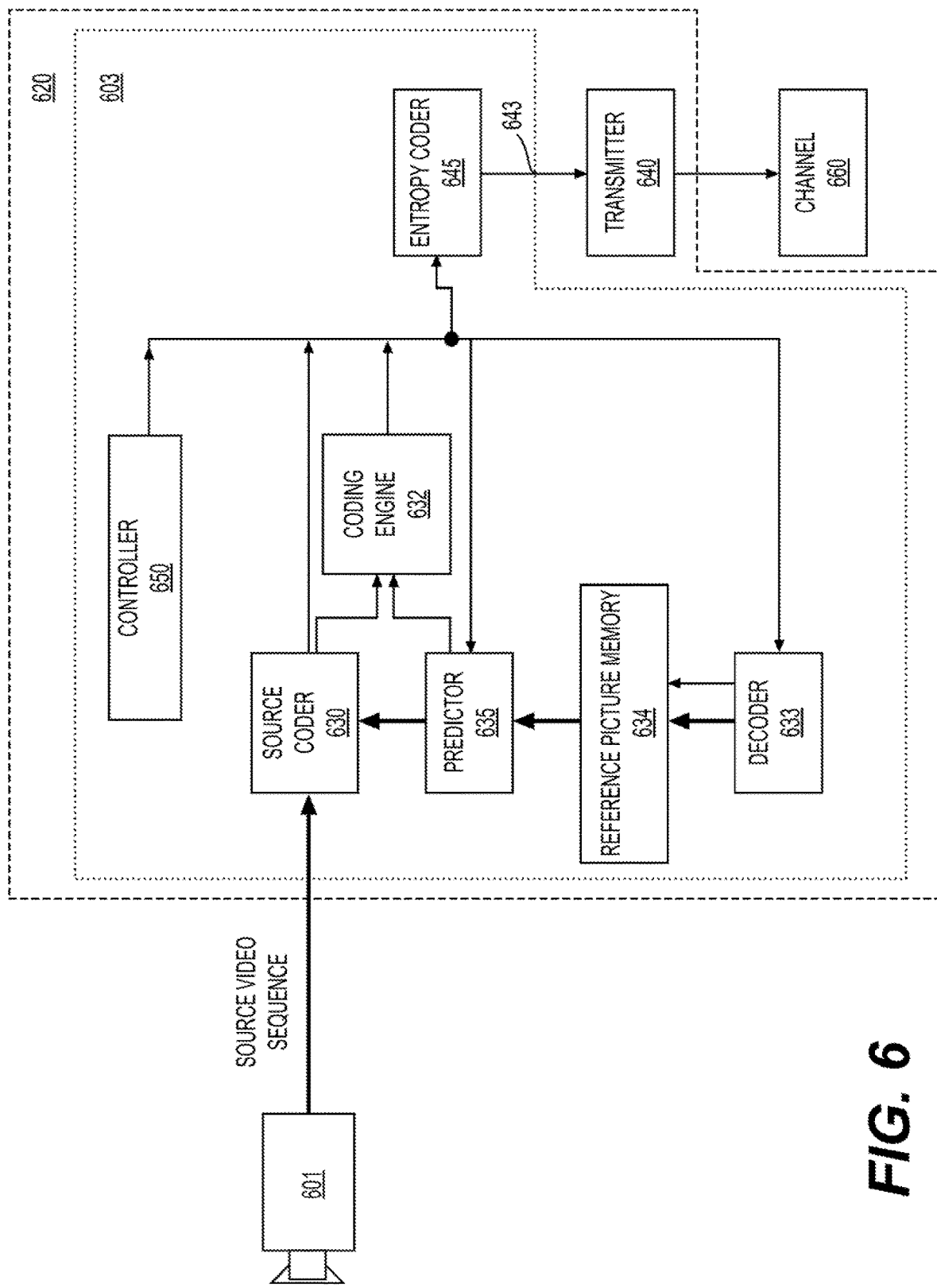
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
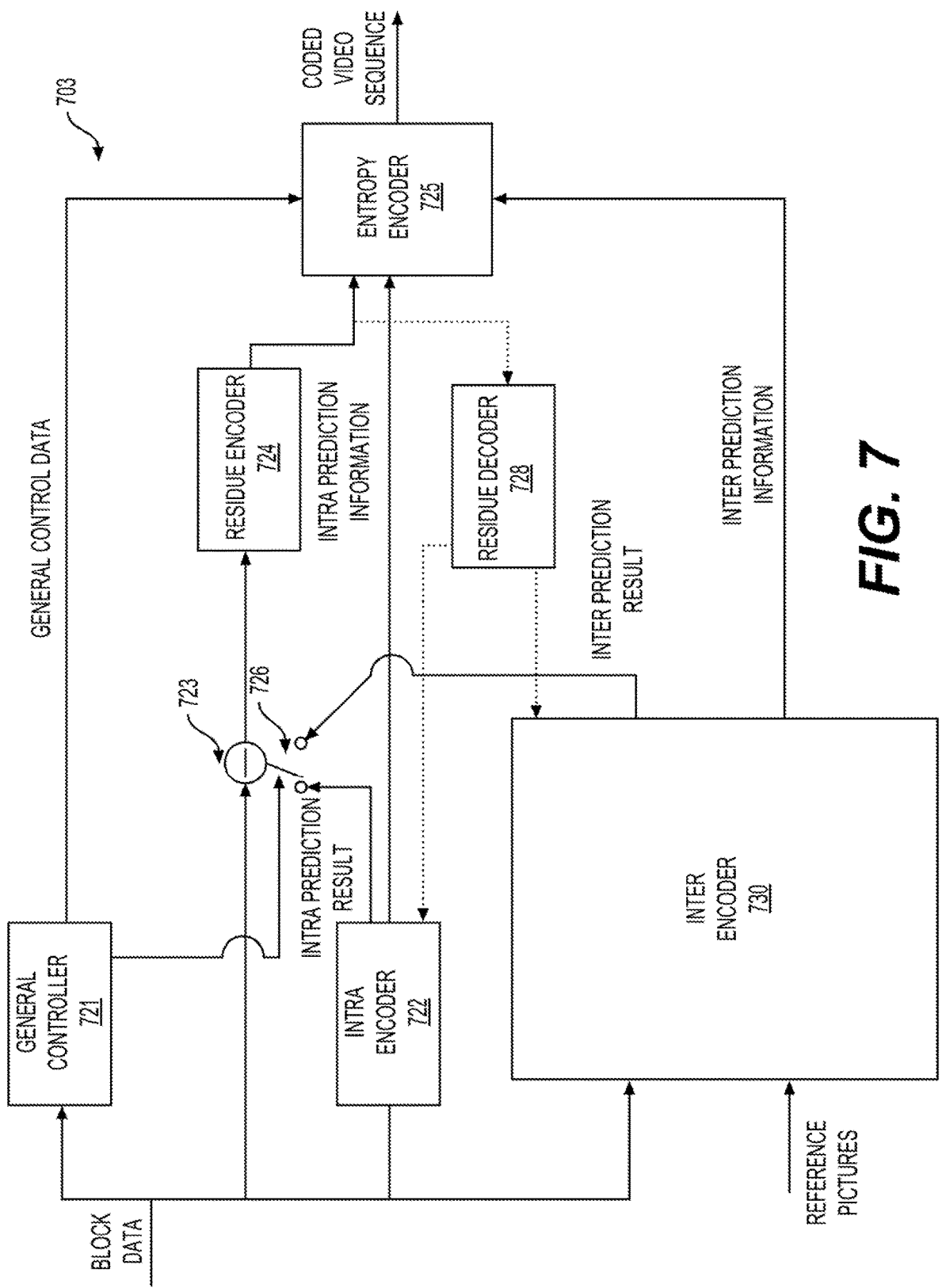
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
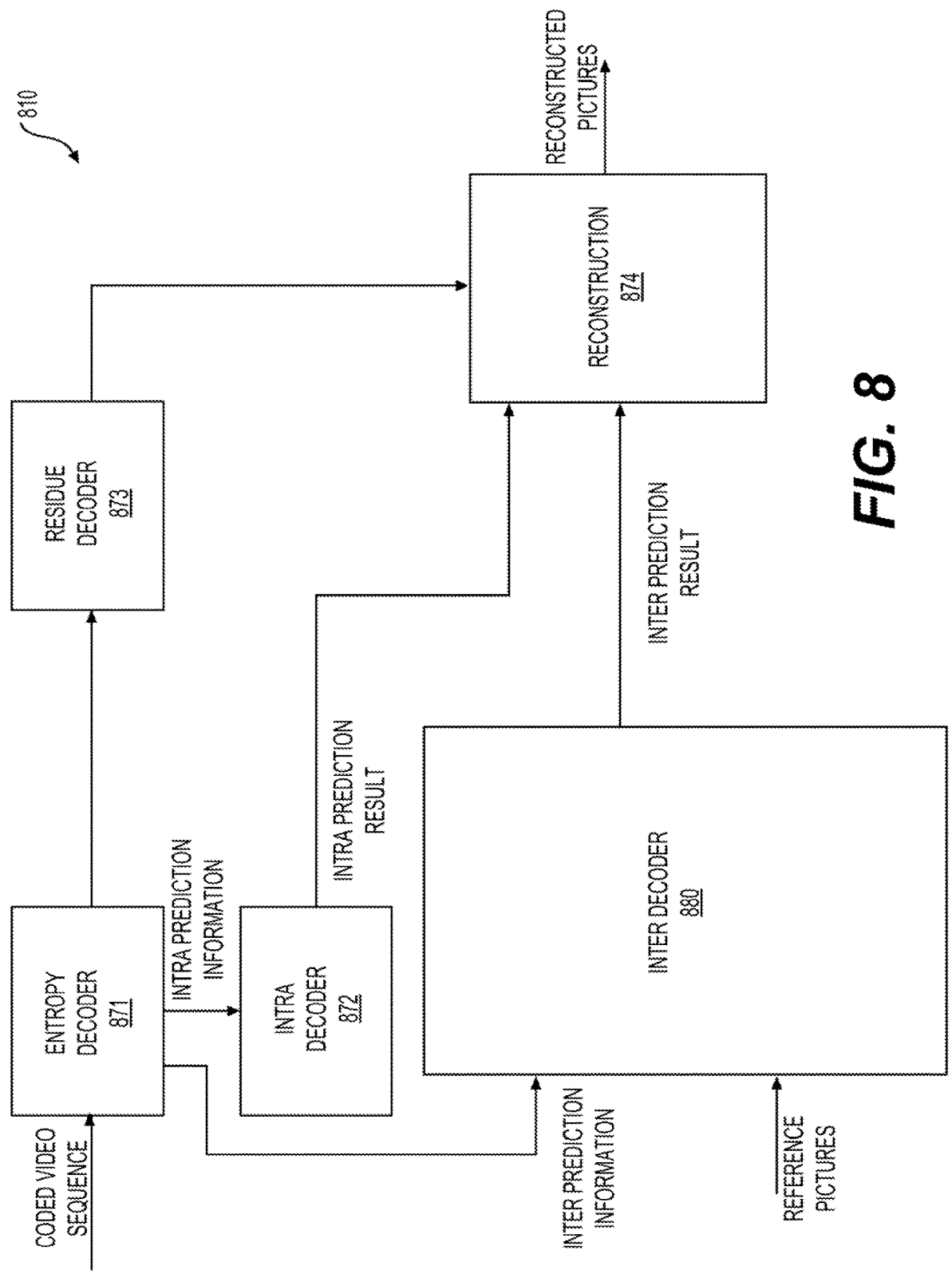
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

An entropy coder, such as the entropy coder (645) in the FIG. 6 example or the entropy encoder (725) in the FIG. 7 example, can perform entropy coding (e.g., entropy encoding) to encode various information. Referring back to FIG. 7, the entropy encoder (725) can encode control information related to video/picture coding, (e.g., prediction information), residual signals (e.g., transform coefficients), and/or the like. The prediction information can include intra prediction information (e.g., intra prediction mode information), inter prediction information (e.g., motion information, inter prediction mode information), prediction information for other prediction mode(s), and/or the like. For example, the motion information includes motion vector differences (MVDs).

Entropy coding can be performed after a video/image signal is converted to syntax elements. Entropy coding can be a lossless compression scheme that uses statistic properties to compress data. For example, by performing entropy coding over a set of syntax elements, bits (referred to as bins) representing the syntax elements can be converted to fewer bits (referred to as coded bits) in a bitstream.

Various methods can be used to convert the control information and the residual signals described above into syntax elements. In an embodiment, residual signals of a transform block are transformed from a spatial domain to a frequency domain (e.g., a spatial frequency domain) to generate a block of transform coefficients. Quantization can be performed to quantize the block of transform coefficients into a block of transform coefficient levels (e.g., integers). Various techniques may be used to convert residual signals into transform coefficient levels. The block of transform coefficient levels can be processed to generate syntax elements. The syntax elements can be input into an entropy encoder and can be encoded into bits in a bitstream.

Figure 9:
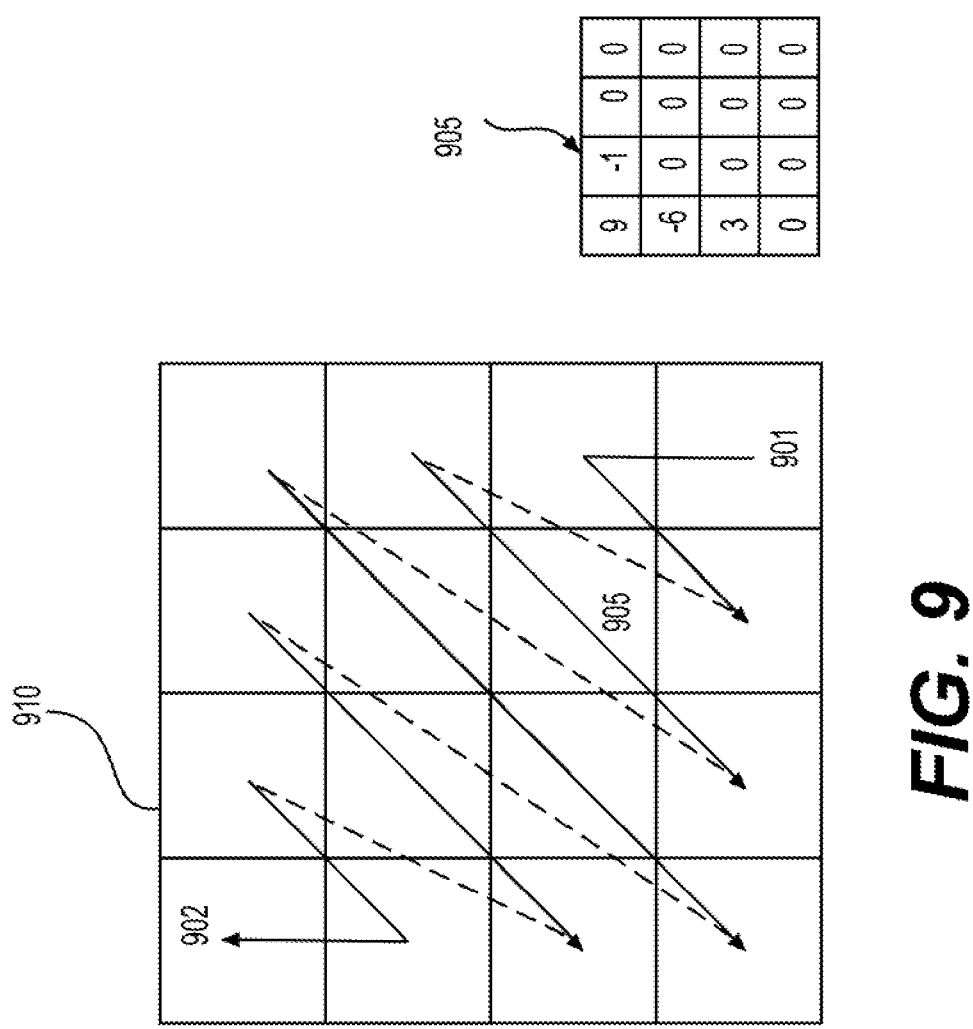
FIG. 9 shows an example of a subblock scan order.

In an embodiment, the syntax elements are generated from the transform coefficient levels as below. The block of transform coefficient levels can include one or more subblocks. The subblocks can be processed according to a predefined scan order. FIG. 9 shows an example of the subblock scan order, such as an inverse diagonal scan order indicated by arrows. A block (910) is partitioned into 16 subblocks. The subblock (901) at the bottom-right corner is first processed, and the subblock (902) at the top-left corner is last processed. For a subblock within which the transform coefficient levels are all zero, the subblock can be skipped without being processed.

For a subblock having at least one non-zero transform coefficient level, multiple (e.g., four) passes of scan can be performed. An example of transform coefficient levels of the subblock (905) is shown. The subblock (905) includes four non-zero transform coefficient levels (e.g., −9, −1, 6, and 3). During each pass, the 16 positions (in the spatial frequency domain) in the subblock (905) can be scanned, for example, in the inverse diagonal scan order.

Figure 10:
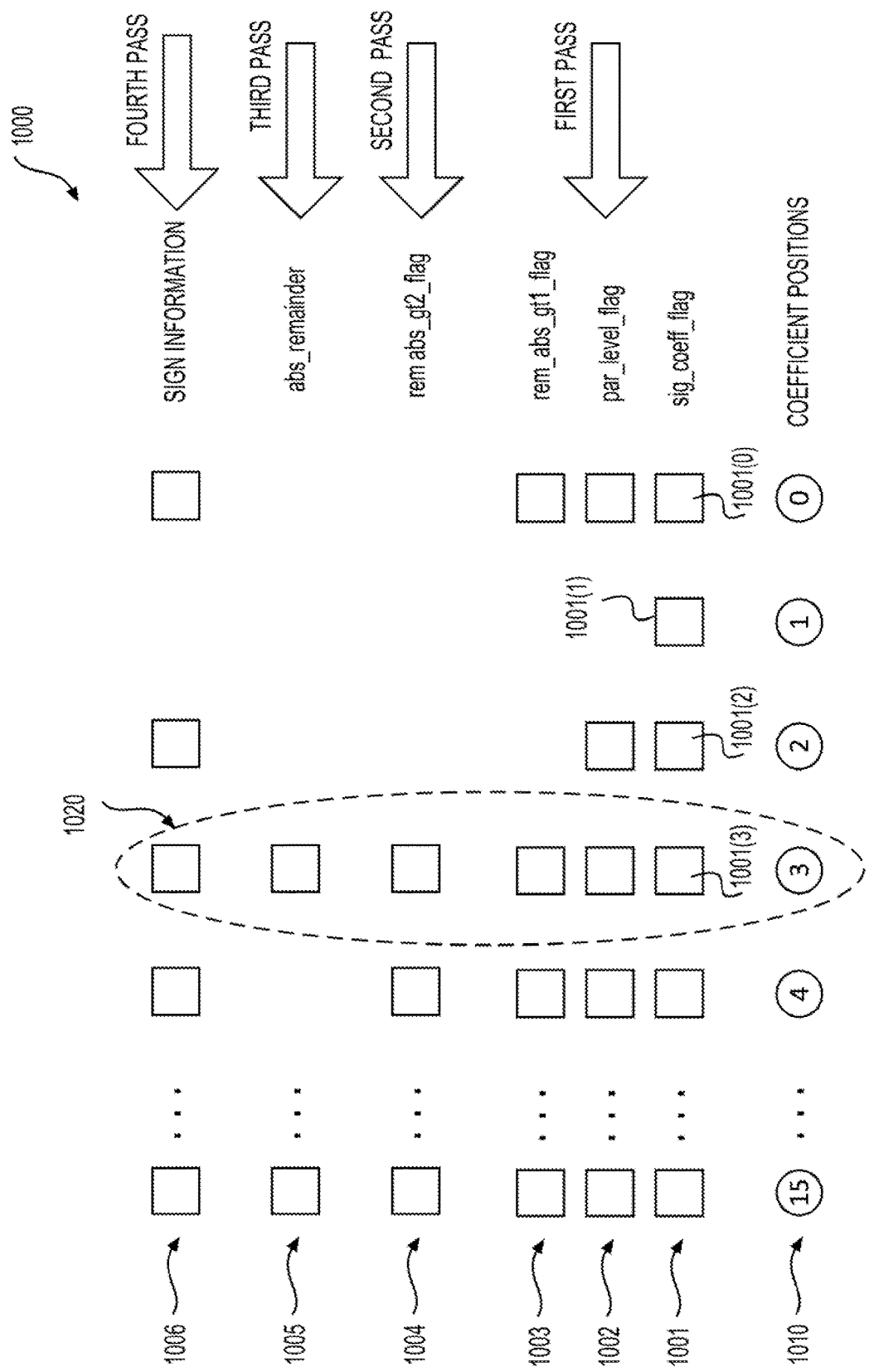
FIG. 10 shows an example of a subblock scanning process.

Transform coefficient levels can be binarized using any suitable methods. FIG. 10 shows an example of binarization of a group of transform coefficient levels, for example, in a subblock.

FIG. 10 shows an example of a subblock scanning process (1000). Sixteen positions (e.g., coefficient positions) (1010) corresponding to 16 transform coefficient levels inside a subblock (e.g., a subblock in FIG. 9) are shown in one dimension at the bottom of FIG. 10. The positions (1010) are numbered from 0 to 15 reflecting the respective scan order (from 0 to 15). During a first pass, the positions (1010) are scanned from 0 to 15, and three bin strings (1001)-(1003) can be generated.

The bin string (1001) can include significance flags (e.g., sig_coeff_flag) at the respective positions (1010). Each bin (e.g., the significance flag) in the bin string (1001) can indicate whether an absolute transform coefficient level (e.g., absLevel) of the respective transform coefficient is zero (e.g., sig_coeff_flag being 0) or larger than zero (e.g., sig_coeff_flag being 1).

The bin string (1002) can include parity flags (e.g., par_level_flag) at the respective positions (1010). Each bin (e.g., the parity flag) in the bin string (1002) can indicate a parity of the absLevel of the respective transform coefficient.

The bin string (1003) can include greater 1 flags (e.g., rem_abs_gt1_flag) at the respective positions (1010). Each bin (e.g., the greater 1 flag) in the bin string (1003) can indicate whether (absLevel−1)>>1 is greater than 0. The greater 1 flags are generated only when the absLevel of the respective transform coefficient is non-zero.

In an example, a bin string (1004) is generated during a second pass. The bin string (1004) can include greater 2 flags (e.g., rem_abs_gt2_flag). Each bin (e.g., the greater 2 flag) in the bin string (1004) can indicate whether the absLevel of the respective transform coefficient is greater than 4. The greater 2 flags are generated only when (absLevel−1)>>1 is greater than 0 for the respective transform coefficient.

In an example, a bin string (1005) is generated during a third pass. The bin string (1005) can include remainder value(s) (e.g., abs_remainder). Each bin (e.g., a remainder value) in the bin string (1005) can indicate the remainder value of the absLevel of the respective transform coefficient that is greater than 4. The remainder value(s) are generated only when the absLevel of the respective transform coefficient is greater than 4.

In an example, a bin string (1006) is generated during a fourth pass. The bin string (1006) can indicate sign(s) of respective non-zero coefficient level(s). Each bin (e.g., a sign) in the bin string (1006) can indicate the sign of the respective transform coefficient level.

The bin string (1001) includes 16 bins corresponding to the 16 positions (1010). Other bin strings (1002)-(1006) can include 16 or less bins. If corresponding information does not exist for any of the 16 positions (1010), the respective bin string is not generated. For example, if no remainder values exist for the 16 positions (1010), the bin string (1005) is not generated.

Referring to FIG. 10, each transform coefficient level (e.g., the transform coefficient level at the position 3) can be determined based on a corresponding set of bins (e.g., bins (1020)) at the same position (e.g., the position 3). The set of bins (e.g., (1020)) can include a respective bin (e.g., if the bin is available) from each of the bin strings (1001)-(1006).

The bin strings (1001)-(1006) can be encoded, for example, by an entropy encoder as described in FIGS. 6-7. In an example, the entropy encoder implements context-based adaptive binary arithmetic coding (CABAC), which is a form of entropy encoding. For example, CABAC is used in various video coding standards, such as the H.264/MPEG-4 AVC and HEVC standards. CABAC can be a lossless compression technique. CABAC is based on arithmetic coding. Binary symbols can be encoded, and the complexity can be low and probability modelling for more frequently used bits of any symbol is allowed.

In CABAC, a context model (also referred to as a probability model) providing a probability estimate for a bin in a bin string (e.g., one of (1001)-(1006)) can be determined for the bin. In some examples, the probability model is determined by a fixed choice without context modeling.

In some examples, if bins in a bin string are locally well correlated, the probability model is determined with context modeling, for example, based on a local context associated with a bin-to-be-coded in the bins. Thus, which context model is used to code the bin-to-be-coded can be based on a local context of a particular bin. Selecting the context model adaptively based on a local context can provide better probability modelling. For example, referring to FIG. 10, a local context for a bin (1001(3)) associated with the position 3 can include transform coefficient level information associated with the positions 1-2, positional information of the position 3, and/or the like.

Figure 11:
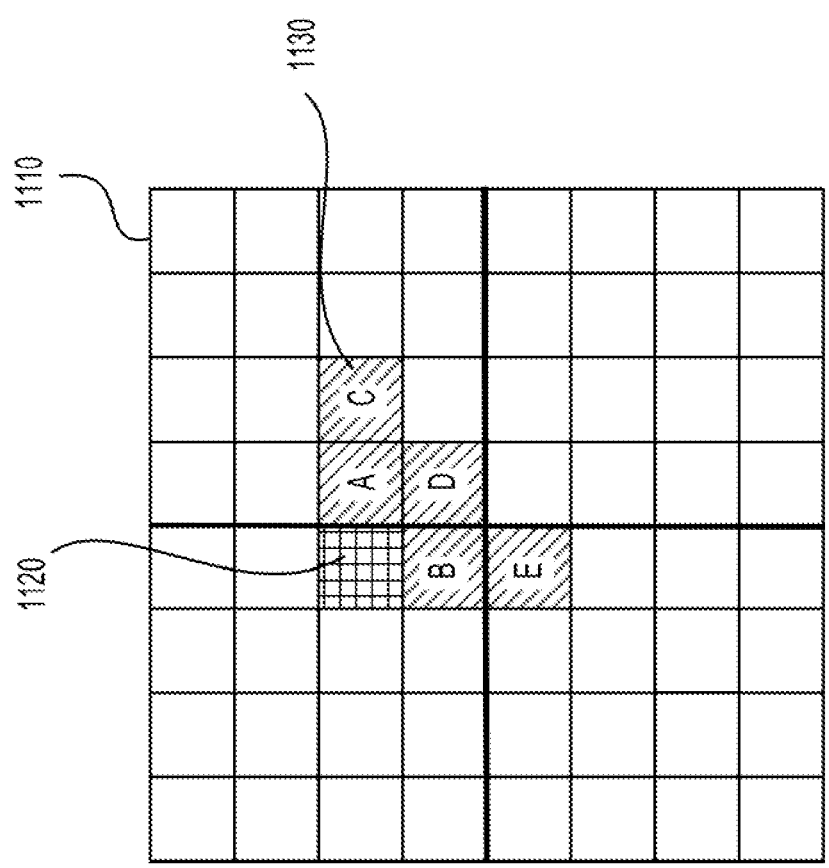
FIG. 11 shows an example of a local template used for context selection for a current bin corresponding to a current position.

FIG. 11 shows an example of a local template (or context template) (1130) used for context selection for a current bin corresponding to a current position (or a current coefficient) (1120). The local template (1130) can cover a set of neighboring positions (e.g., A-E) or neighboring transform coefficients of the current position (1120) in a coefficient block (1110). In the FIG. 11 example, the coefficient block (1110) has 8×8 positions, and includes transform coefficient levels at the 64 positions. The local template (1130) can be defined to be a 5-position template at the bottom-right side of the current coefficient (1120). The local template can include less positions or more positions. In an example, the local template includes two positions (e.g., A-B) that neighbor the current coefficient (1120) and does not include C-E. When an inverse diagonal scan order is used for multiple passes over the positions within the coefficient block (1110), the positions within the local template (1130) are processed prior to the current coefficient (1120).

During the context modeling, a context model for the current bin corresponding to the current coefficient (1120) can be determined based on information of the local template (1130), such as information of the transform coefficient levels within the local template (1130). A template magnitude can be defined to indicate magnitudes of the transform coefficients or transform coefficient levels within the local template (1130). In an example, the context model is selected based on the template magnitude.

In one example, the template magnitude is defined to be a sum (e.g., sumAbs1) of partially reconstructed absolute transform coefficient levels inside the local template (1130). A partially reconstructed absolute transform coefficient level can be determined according to bin strings (e.g., the bin strings (1001)-(1003)). In an embodiment, a partially reconstructed absolute transform coefficient level at a position (x, y) can be determined according to:

$$\text{absLevel1}[x][y]=\text{sig\_coeff\_flag}[x][y]+\text{par\_level\_flag}[x][y]+2*\text{rem\_abs\_gt1\_flag}[x][y] \quad \text{Eq. (1)}$$

where x and y are coordinates with respect to a top-left corner of the coefficient block (1110).

In some embodiments, the current bin is the bin in the bin string (1001) corresponding to the current coefficient (1120), a context model is selected based on sumAbs1. In an example, the context model for the current bin is selected based on the sumAbs1 and a diagonal position d of the current bin. d is x0+y0, and x0 and y0 are coordinates of the current position (1120) with respect to the top-left corner of the coefficient block (1110). The diagonal position d within the scanning path can indicate a spatial frequency of the current coefficient (1120), and the adaptive context modeling based on the diagonal position d is interpreted as a spatial frequency-dependent context modeling.

As described in FIG. 11, when bins, such as bins in the bin string (1001)-(1003), are statistically correlated, which context model is selected for the current bin at the current position (1120) can depend on a context. The context can include information of the neighboring positions, for example, in the local template (1130). The context can include position information (e.g., d) of the current bin, indicating a spatial frequency-dependent context modeling.

Different types of bin strings can have distinct statistical characteristics, and thus can be encoded with different sets of context models. For example, a first set of context models is configured for the bin string (1001) and a second set of context models is configured for the bin string (1002). Other set(s) of context models can be configured to code other types of bin strings, such as a bin string associated with MVDs.

Different context models can be selected for bins in a same bin string (e.g., (1001)), for example, based on a diagonal position d and/or sumAbs1.

In an example, a non-binary syntax element is represented by a single bin string, and bins in the single bin string are statistically correlated.

Certain type(s) of bin strings are not coded with context models. For example, the bin string (1006) is encoded using a bypass coding mode described in FIG. 13.

FIG. 12A shows an exemplary CABAC based entropy encoder (1200A) in accordance with an embodiment. For example, the entropy encoder (1200A) can be implemented in the entropy coder (645) in the FIG. 6 example, or the entropy encoder (725) in the FIG. 7 example. The entropy encoder (1200A) can include a context modeler (1210) and a binary arithmetic encoder (1220). In an example, various bin strings are inputs to the entropy encoder (1200A). The bin strings can include binary valued syntax element(s) and/or bin strings converted from non-binary valued syntax element(s).

In an example, the context modeler (1210) performs a context modeling process to select a context model for a bin in a received bin string. A context model can be determined for the received bin, for example, based on a type of the bin (e.g., (1001) or (1003)), a color component type of the transform component, a position (e.g., a diagonal position d) of the transform coefficient associated with the received bin, and previously processed neighboring transform coefficients (e.g., the local template (1130)) associated with the bin, and/or the like. The context model can provide a probability estimate for a next bin in the bin string, for example, based on a value (e.g., "0" or "1") of the received bin and a probability estimate of the bin.

Various probability models can be used to determine (e.g., update) the probability estimate for bins in the received bin string. Referring to FIG. 10, in an embodiment, a probability estimate p[k+1] for a bin b[k+1] (e.g., 1001(2)) can depend on a probability estimate p[k] for a bin b[k] (e.g., 1001(1)) and a value of the bin b[k]. The probability model $f_a$ can be modified by varying a parameter "a", as shown in Eq. (2).

$$p[k+1] = f_a(p[k], b[k]) \quad \text{Eq. (2)}$$

p[k+1] can indicate the probability of the bin b[k+1] being "1" or "0". In an example, p[k+1] indicates the probability of the bin b[k+1] being "1". The probability of the bin b[k+1] being "0" can be determined based on p[k+1]. Alternatively, if p[k+1] indicates the probability of the bin b[k+1] being "0", the probability of the bin b[k+1] being "1" can be determined based on p[k+1].

p[k] can be represented by a multi-bit integer $k_n$, such as a 7-bit integer $k_n$ (e.g., 0-127), and probabilities are discretized with probability states (e.g., 128 states). An update of the probability can be implemented, for example, using a lookup table (e.g., a state transition table), for example, mapping from one state (e.g., a first number indicating p[k]) to another state (e.g., a second number indicating p[k+1]) depending on the value of b[k]. The parameter "a" can indicate an adaptation rate, for example, a difference Δp between two adjacent probability states. For example, p[k+1] indicates the probability of the bin b[k+1] being "1". If b[k] is 1, p[k+1] is larger than p[k] (e.g., Δp>0) estimating that the bin b[k+1] is more likely to be "1" than b[k]. Otherwise, if b[k] is 0, p[k+1] is less than p[k] (e.g., Δp<0) estimating that the bin b[k+1] is less likely to be "1" than b[k].

In an example, an arithmetic coding engine can use the probability states directly. A multiplication-free range division can be employed in CABAC by using quantized probability ranges and probability states.

In another embodiment, multi-hypothesis probability estimation is applied. A probability can be estimated by averaging multiple estimates (e.g., two estimates q1[k] and q2[k]) with different adaptation rates as shown in Eqs. (3)-(5).

$$q1[k+1] = f_{a1}(q1[k], b[k]) \quad \text{Eq. (3)}$$

$$q2[k+1] = f_{a2}(q2[k], b[k]) \quad \text{Eq. (4)}$$

$$p[k+1] = \frac{w1 \times q1[k] + w2 \times q2[k]}{2} \quad \text{Eq. (5)}$$

Parameters a1 and a2 indicate adaptation rates of the two estimates q1[k] and q2[k], respectively. a1 can be different from a2. The descriptions of Eq. (2) can be suitably adapted to Eqs. (3)-(4). When W1 is different from W2, Eq. (5) shows a weighted average p[k+1] of the multiple estimates q1[k+1] and q2[k+1].

A context model list (1202) can include context models. The context model list (1202) can be stored in memory (1201). Each entry in the context model list (1202) can represent a context model. Each context model can be assigned an index, referred to as a context model index, or context index. In an example, the memory (1201) stores a probability estimate p[k], or a probability state indicating the probability estimate. During the context modeling, the context modeler (1210) can select a context model from the context model list (1202) and assign the selected context model to the bin.

A probability estimate of a context model can be initialized, for example, for a first bin to be encoded in a bin string. After the context model on the context model list (1202) is assigned to encode the bin, the context model can subsequently be updated, for example, using Eq. 2 or Eqs. 3-5, according to a value of the bin with an updated probability estimate.

In an example, the binary arithmetic encoder (1220) receives the bin and the associated context model (e.g., a probability estimate), and performs a binary arithmetic coding process based on the probability estimate, and thus a sequence of bins are converted to coded bits. The bin can be encoded based on the actual state of the associated adaptive probability model that is passed along with the bin value. The coded bits are generated and can be transmitted in a bitstream. The context model can be adaptive, for example, the context selection for a next bin in the received string can depend on the value of a previously encoded/decoded bin as described in FIG. 11.

Figure 12B:
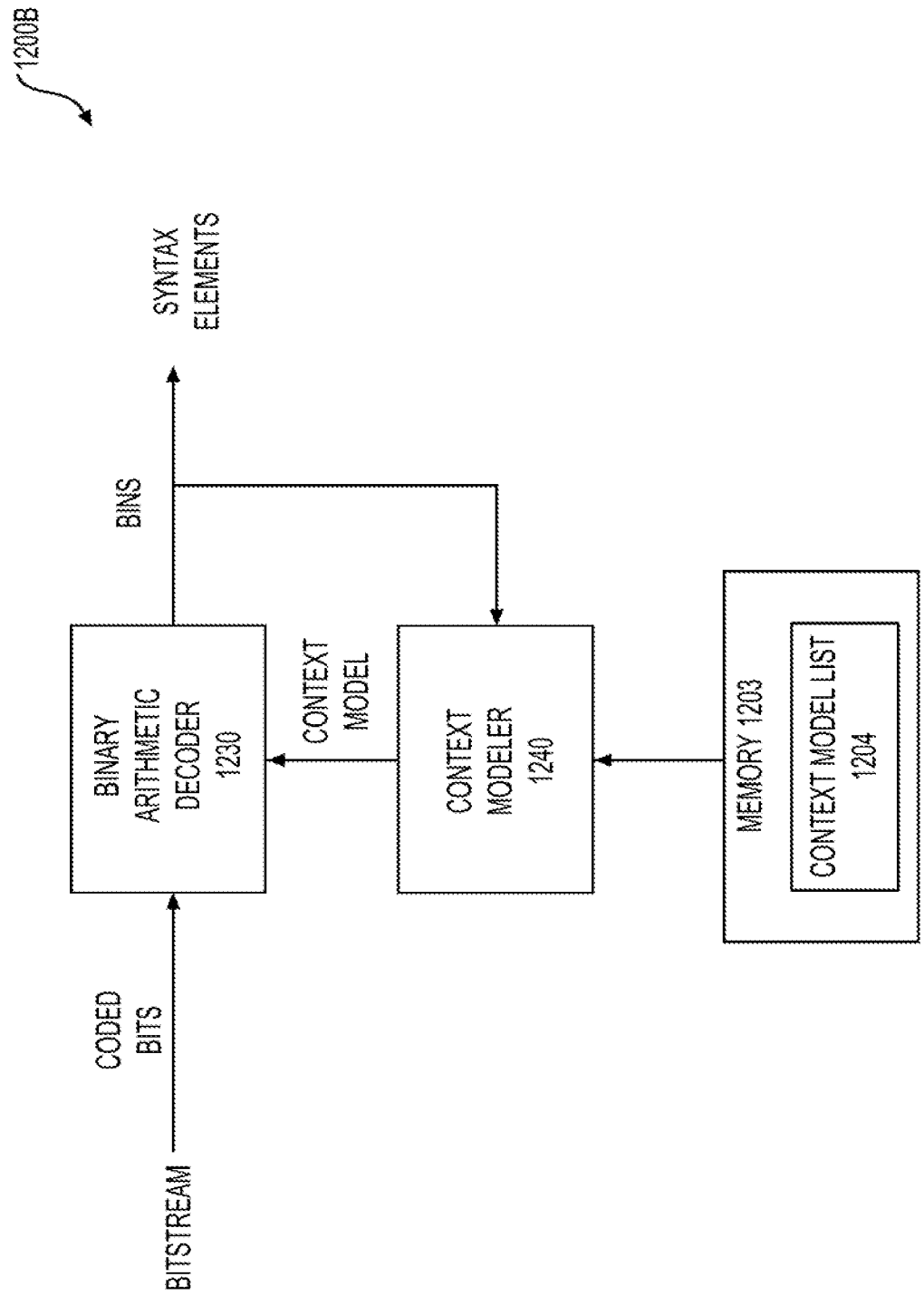
FIG. 12B shows an exemplary CABAC based entropy decoder in accordance with an embodiment.

FIG. 12B shows an exemplary CABAC based entropy decoder (1200B) in accordance with an embodiment. For example, the entropy decoder (1200B) can be implemented in the parser (520) in the FIG. 5 example, or the entropy decoder (871) in the FIG. 8 example. The entropy decoder (1200B) can include a binary arithmetic decoder (1230), and a context modeler (1240). The binary arithmetic decoder (1230) receives coded bits from a bitstream, and performs a binary arithmetic decoding process to recover bins from the coded bits. The context modeler (1240) can operate similarly to the context modeler (1210). For example, the context modeler (1240) can select a context model from a context model list (1204) stored in a memory (1203), and provide the selected context model to the binary arithmetic decoder (1230). The memory (1203) and the context model list (1204) can be similar or identical to the memory (1201) and the context model list (1202), which are described in FIG. 12A.

In an example, the context modeler (1240) determines the context model based on the recovered bins from the binary arithmetic decoder (1230).

Different entropy encoding schemes can be employed for encoding different bin strings. For example, the significance flags, parity flags, greater 1 flags, and greater 2 flags can be encoded with a CABAC based entropy encoder, such as that described in the FIG. 12A example. The syntax elements generated during the third and fourth passes can be encoded with a CABAC-bypassed entropy encoder (e.g., a binary arithmetic encoder with fixed probability estimates for input bins).

Figure 13:
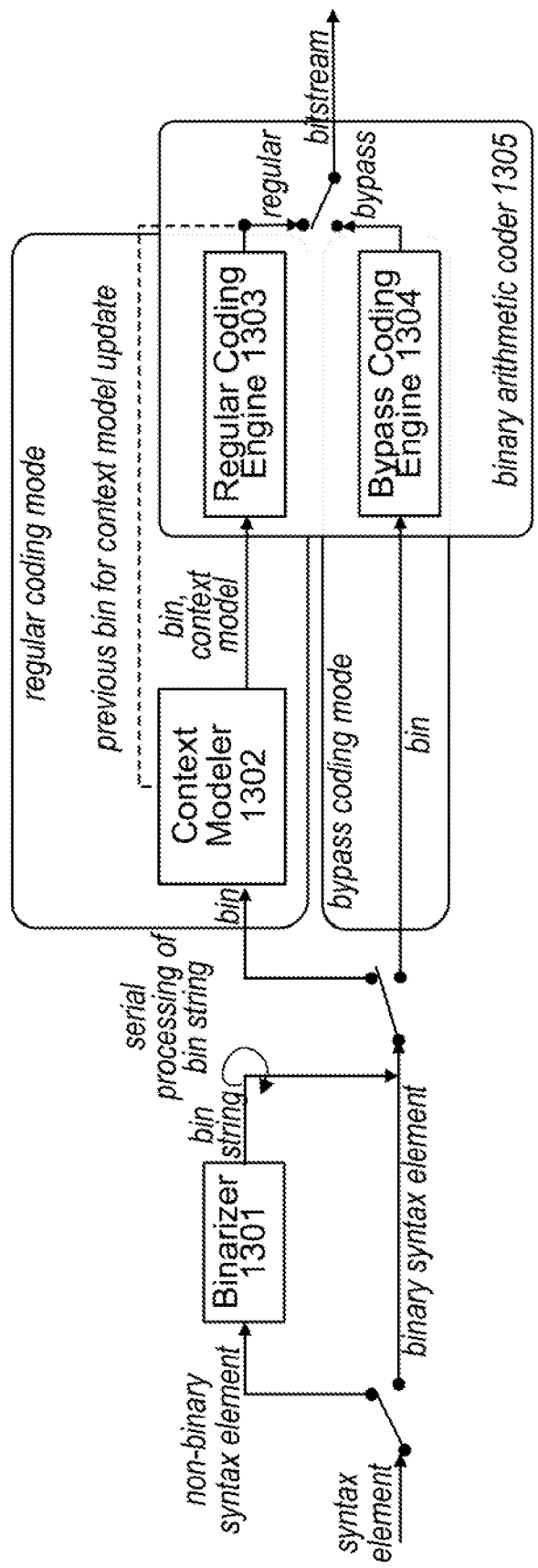
FIG. 13 shows an example of CABAC used in an encoder.

FIG. 13 shows an example of CABAC, such as used in an encoder (e.g., (645), (725)). CABAC can have multiple probability modes for different contexts. In CABAC, coding a data symbol can include one or more stages, such as binarization, context modeling, and/or binary arithmetic coding. One or more stages can be omitted or modified. Additional stage(s) may be added.

In some embodiments, non-binary symbols (e.g., all non-binary symbols), such as non-binary syntax elements can be converted into binary, such as bin strings, by binarization with a binarizer (1301). In an example, a bin string is generated based on a non-binary syntax element. For a bit (or a bin) in a bin string, a coder can select which probability model to use (context modeling), and can use information from nearby elements to optimize a probability estimate. Arithmetic coding can be applied to compress the data, for example, with a binary arithmetic coder (1305). For some binary symbols, if the probability of being "1" or "0" is equal without a good context to better estimate the probability, the binary symbols can be coded without using a context model, and thus a bypass coding is used. The example or a variation shown in FIG. 13 can be used in H.264/AVC or other video coding standards. The context modeling can provide estimates of conditional probabilities of the coding symbols. Utilizing suitable context models, a given inter-symbol redundancy can be exploited by switching between different probability models according to already-coded symbols in the neighborhood of the current symbol to be encoded.

In an embodiment, CABAC uses binary arithmetic coding, and thus only binary decisions (1 or 0) are encoded. In the binarization, a non-binary-valued symbol (e.g. a transform coefficient or a motion vector) can be binarized or converted into a binary with the binarizer (1301) prior to arithmetic coding. The binarization process can be similar to a process of converting a data symbol into a variable length code except that the binary code is further encoded (e.g., by the arithmetic coder) prior to transmission. Binarization can be skipped if a symbol or a syntax element is a binary syntax element. Bins from the binarizer (1301) can be input to the binary arithmetic coding engine.

The bin string can be the binarized symbol from the binarizer (1301) or the binary syntax element. In an example, bins in a bin string are processed sequentially. One or more stages in CABAC can be repeated for each bit (or "bin") of a bin string.

A coding mode decision between a regular coding mode and a bypass coding mode can be made for each bin, for example, based on a statistical correlation between the respective bin and other bins in the bin string. For example, the bypass coding mode is chosen for bins related to sign information (e.g., bins in (1006)) or for lower significant bins (e.g., bins in (1005)) that may be uniformly distributed. If the bypass coding mode is selected, the regular binary arithmetic encoding process can be bypassed for the bins. In the bypass coding mode, the bin is coded with a bypass coding engine (1304). For example, arithmetic coding based on fixed probably model may be used, such as using Golomb-Rice.

In the regular coding mode, the context modeler (1302) can select a context model, such as a probability model, for a bin. A context model is a probability model for one or more bins of a binarized symbol. As described in FIG. 12A, the context model may be chosen from a selection of available context models (e.g., in (1202)), for example, depending on statistics of recently coded data symbols. The context model can store the probability of each bin being "1" or "0".

In an example, the context modeler (1302) can select a context model, for example, based on a local template, a diagonal position, and/or the like as described in FIG. 11. When the context model is selected adaptively, different bins in the bin string (e.g., the bins in (1001)) can have different context models associated with different context model indices.

The descriptions of the context modeler (1210) can be applied to the context modeler (1302). In an example, the context modeler (1302) is similar or identical to the context modeler (1210).

The context models can be designed for a variety of syntax elements. As described above, the context models can be designed for different types of syntax elements. Exemplary classes of syntax elements include residual information (e.g., transform coefficients), control information (e.g., MVDs, a skip mode flag, prediction mode information, block information, and the like). One type of syntax element (e.g., MVDs) can be associated with multiple context models.

The previous coding results of the syntax elements (being "1"s or "0"s) can be used to update the context state or the probability state (e.g., the probability of each bin being "1" or "0") of each binarized symbol, making the context models more adaptive to the local property of the syntax elements. The coding efficiency can be improved by having a correct prediction from the updated context state. Generally, after certain adaptation, if a symbol is more likely to be "1" (e.g., from history results), the context state can be updated to lean towards "1", instead of "0".

The context modeler (1302) can output the bin and the context model (e.g., the probability state). The selected context model can be updated based on an actual coded value (e.g., if the bin value is "1", the frequency count of "1"s is increased).

An arithmetic coder (1305) can encode each bin according to the selected probability model. In an example, two sub-ranges (corresponding to "0" and "1") are used for each bin. When the bypass coding mode is selected, the bypass coding engine (1304) is used to code a bin. When the regular coding mode is selected, the regular coding engine (1303) is selected to code a bin. In an example, the regular coding mode is applied to code bins where the probability of a value of a bin is predictable given the values of previously coded bins. The bypass coding engine (1304) can be a fast branch of the coding engine with a considerably reduced complexity while the regular coding engine (1303) encodes the given bin value depends on an actual state of the associated adaptive probability model that is passed along with the bin value.

When the regular coding mode is selected, the selected context model can be updated based on the actual coded value (e.g., if the bin value was "1", the frequency count of "1"s is increased).

In some embodiments, such as for random access and parallel processing purposes, image and video signals are split into smaller coding segments that can be coded (e.g., coded independently) without relying on immediately previously decoded data in a decoding order. For each binarized symbol, the context model(s) can have an initial state at the beginning of the coding segment, instead of inheriting the existing context state of previously coding results. A coding segment can include a picture, a slice, a tile, a CTU row, a CTU, and/or the like. Without a good initialization, the CABAC engine may require a series of adaptation to adjust the context state of the models after coding some input symbols. Therefore, the performance of compression can be affected at the early stage of the coding segment if the initial state of the context model and the real probability of the coded symbol are not matched.

Figure 14:
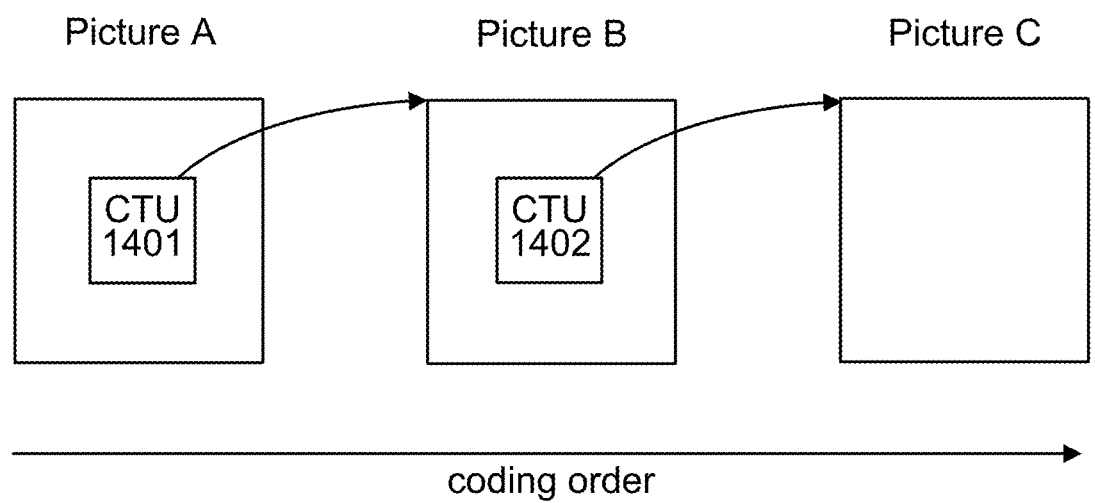
FIG. 14 shows an example of CABAC initialization for a current picture using a context state from a reference picture.

FIG. 14 shows an example of CABAC initialization for a current picture using a context state from a reference picture. In some examples, CABAC context state(s) (or CABAC probability states) at a fixed location of a picture or a slice can be stored as the estimated initial state(s) for the CABAC context state at the beginning of decoding/encoding a next picture or a next slice. Pictures A-C in a coding order are shown in FIG. 14. In an example, the picture A is coded prior to coding the pictures B-C. Initial probability state(s) for the CABAC context state(s) used to code the beginning (e.g., a first bin string or a first syntax element to be coded) of the picture B can be determined (e.g., estimated) based on the CABAC context state(s) at a CTU (1401) in the picture A, which is the previously coded picture of the picture B.

In an example, initial probability state(s) for the CABAC context state(s) used to code the beginning (e.g., a first bin string or a first syntax element to be coded) of the picture C can be determined (e.g., estimated) based on the CABAC context state(s) at a CTU (1402) in the picture B, which is the previously coded picture of the picture C.

The local property of signals (e.g., residual information, control information) can vary from one region to another region inside a same picture or a same slice. Using the embodiments described in FIG. 14 to perform the context state initialization may not be optimal in terms of prediction accuracy. According to an embodiment of the disclosure, adaptive CABAC initial state selection from coded pictures can be performed to estimate the probability state of context models at the beginning of a new coding segment.

To adapt to different statistics, initial state tables can be pre-defined or predicted for intra (I)-, bi-predictive (B)- and predictive (P)-slice types separately. An I slice (an intra slice) can be coded (e.g., decoded) using intra prediction only. A B-slice can be coded (e.g., decoded) using intra prediction or using inter prediction, for example, with at most two motion vectors and reference indices to predict sample values of each block, and a P slice can be coded (e.g., decoded) using intra prediction or using inter prediction, for example, with at most one motion vector and reference index to predict the sample values of each block. In an example, the initial state table of the I-slice type is only used for intra slices. The initial state tables of the B-slice type and the P-slice type may be selected for inter slices. The description above for I-, B- and P-slice types can be extended to picture types, such as I-, B- and P-picture types. In the following, a slice is used as an example of a coding segment. Each picture may include multiple slices.

As described above, a bin string can be determined based on one or more syntax elements. An initial probability of the bin string can be an initial probability of a syntax element in the one or more syntax elements.

In an example, a syntax element is converted into a bin string. Thus, an initial probability of the bin string (or an initial probability for entropy coding the syntax element) can be a probability (e.g., a probability of being 0 or 1) of the first bin to be coded in the syntax element. The first bin is to be coded prior to coding of other bins in the bin string. Eq. 2 or Eqs. 3-5 can be used to code the syntax element (or the bin string) with the initial probability.

In an example, a group of syntax elements (e.g., the 16 transform coefficient levels in FIG. 10) in a block or a subblock are converted into multiple bin strings (e.g., the bin strings (1001)-(1006)). Each bin string (e.g., (1001)) can be associated with the group of syntax elements. An initial probability of a bin string is a probability of the first bin to be coded in the bin string. The first bin is associated with a single syntax element (e.g., the first syntax element in a scanning pass). For example, the initial probability of the bin string (1001) is the probability of the bin (1001(0)) being 1 or 0, and is associated with the transform coefficient level at the position 0. In the example shown in FIG. 10, a single syntax element (e.g., the transform coefficient level at the position 0) can be associated with multiple initial probabilities, for example, corresponding to (1001)-(1003), respectively. In an embodiment, syntax elements of a current coding segment that is independently codable include at least one syntax element that is to be entropy coded prior to coding remaining syntax elements in the syntax elements. The at least one syntax element can be entropy coded with probability model(s) or context model(s). For example, the at least one syntax element is converted to bin string(s), and the bin string(s) are entropy coded.

An initialization process for the context models can be performed in the entropy coding. In an example, without any prior knowledge of the statistical nature of the at least one syntax element, each of the probability model(s) can be initialized with a probability state corresponding to a uniform distribution, for example, the initial probability state of the respective probability model indicates an equiprobable probability.

In an example, the initial probability of the at least one syntax element is skewed from the equiprobable probability. Another region (e.g., a region in a previously coded picture) that is likely to be statistically correlated with the current coding segment can be determined, for example, based on (i) a location of the current coding segment and (ii) a quantization parameter (QP) of the current coding segment. Previous probability information of the region in the previously coded picture can better reflect the initial probability of the at least one syntax element. Thus, initial probability information that indicates the initial probability of the at least one syntax element can be determined based on the previous probability information of the region, and making the initialization more efficient.

A coding segment is independently codable if the coding segment can be coded independently from previously coded data that is immediately before the coding segment in a coding order. The independently codable coding segment can be coded without relying on the previously coded data that is immediately before the independently codable coding segment in a coding order. The current coding segment can be a current picture, a current region within the current picture, or the like. An area of the region is less than an area of the current picture. The region can be a slice, a CTU, or the like. Examples of an independently codable coding segment include a picture, a slice, a tile, a tile group, a CTU row, a CTU, or the like. In an example, an independently codable coding segment is a slice, such as an I slice, a B slice, or a P slice.

The at least one syntax element in the current coding segment can indicate motion information of the current coding segment, residual data of the current coding segment, and/or control information (e.g., prediction mode information) of coding the current coding segment.

In an example, the at least one syntax element includes syntax element(s) of a first block in the current coding segment. The first block can be coded prior to coding other blocks in the current coding segment.

In an embodiment, the first block in the current coding segment includes multiple subblocks. The at least one syntax element includes syntax element(s) of a first subblock in the first block. The first subblock can be coded prior to coding any other block or subblock in the current coding segment.

In an example, the at least one syntax element includes transform coefficient levels in one of the subblocks, such as shown in FIG. 10. In an example, the at least one syntax element includes MVD(s) of the subblock or the block. To code (i) a first block or (ii) a first subblock that is in the first block to be coded in an independently codable coding segment (referred to as a current coding segment, such as a current slice, a current picture, or the like), initial probability information indicating an initial probability of a bin string associated with one or more syntax elements in the first block or the first subblock can be determined based on previous probability information in one of multiple previous coding segments. Each of the multiple previous coding segments can be previously coded. The previous probability information can indicate a previous probability of a previous bin string associated with one or more previous syntax elements in a previous block or a previous subblock in the previous coding segment, such as a previously decoded picture or slice. The bin string and the previous bin string are of a same type, for example, the bin string is the bin string (1001) including significance flags of the first subblock and the previous bin string includes significance flags of the previous subblock.

The initial probability information can include an initial probability state (or an initial context state) indicating the initial probability. The initial probability information (e.g., the initial context state) can be inherited from the previously coded coding segment (e.g., a previously coded slice or a previously coded picture). To capture the statistical distribution of the current coding segment (e.g., the current slice or the current picture) more efficiently, each context of syntax elements at the beginning of the current coding segment can inherit a stored context state from the previously coded coding segment (e.g., the previously coded picture).

In addition to the initial probability information, other parameter(s) for entropy coding can be inherited when the context states of the current coding segment are initialized from one of the previously coded coding segments. The parameters can include adaptation rates and/or adaptive weights (e.g., when the multi-hypothesis probability estimation with the adaptive weights is used as described in Eqs. (3)-(5)) used to specify probability model(s) (or context model(s)).

Figure 15:
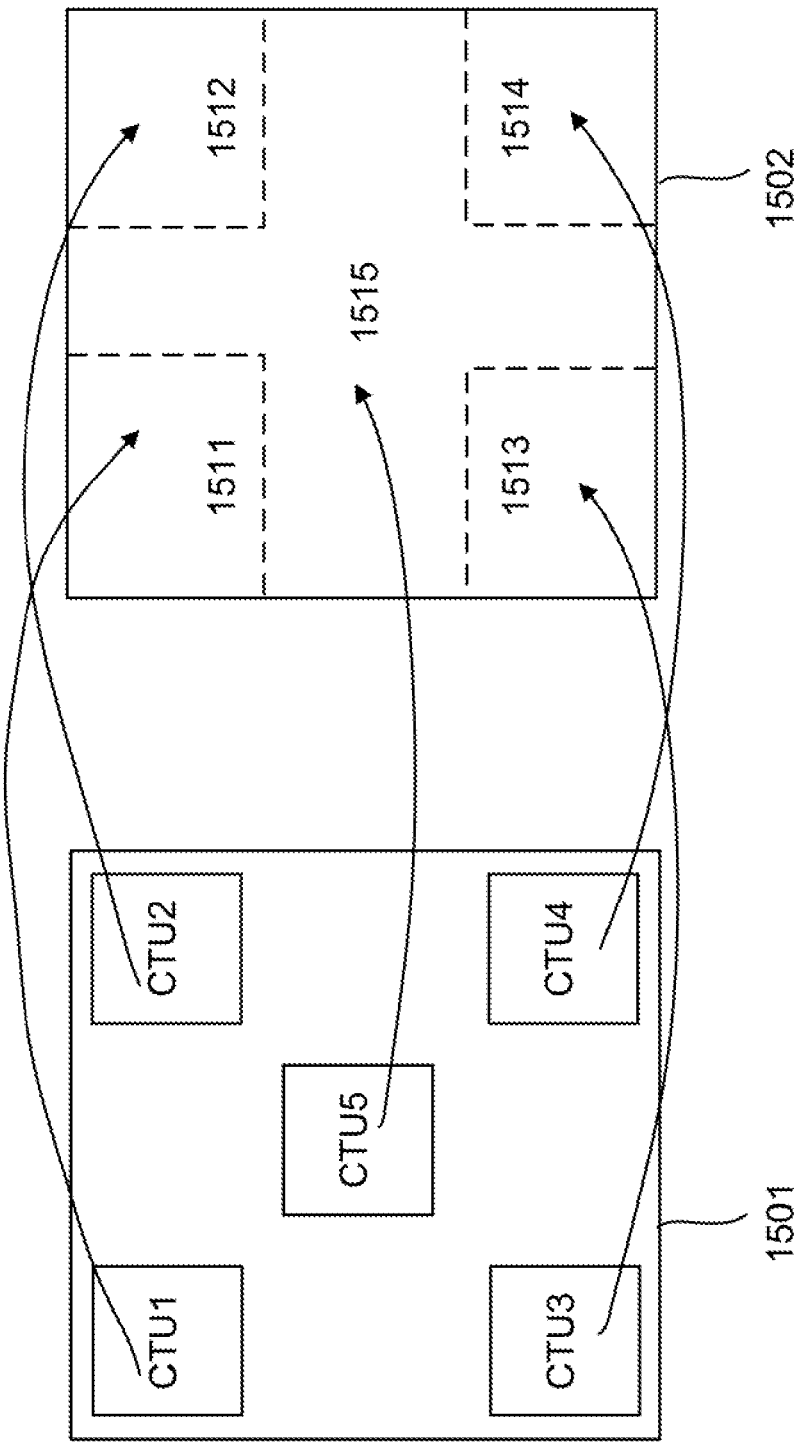
FIG. 15 shows an example of a region-based CABAC context states initialization mapping between a current picture and a reference picture.

Instead of using probability information (e.g., the context states) at a fixed CTU location as described in FIG. 14, a region from the previous picture can be based on where the beginning of the current slice is located in the current picture, and the context states in the region from the previous picture can be used to determine the initial probability information. FIG. 15 shows an example of a region-based CABAC context states initialization mapping between a current picture (1502) and a reference picture (or a previous picture) (1501). The context states from the selected previously coded coding segment (e.g., the previously coded picture) can be determined (e.g., selected) based on where the first block or the first subblock to be coded is located in the current picture. The selected previous picture (1501) can include multiple regions. Each region can have a selected location where probability information (e.g., context states) of one or more syntax elements at the selected location can be stored and used for prediction. In the example of FIG. 15, for each region, a selected CTU can be decided. For example, the previous picture (1501) includes five regions, such as a top-left region including a CTU1, a top-right region including a CTU2, a bottom-left region including a CTU3, a bottom-right region including a CTU4, and a center region including the CTU5. In an example, the five regions are not overlapped. In an example, the five regions can cover the entire previous picture (1501). In an example, an area of the five regions is less than an area of the entire previous picture (1501).

In an example, the probability information, such as the context states (or the probability states), of the one or more coded syntax elements (e.g., the one or more entropy coded syntax elements) of each of the CTUs 1-5 can be stored separately for the respective CTU (or the respective region). The context states of the one or more syntax elements associated with the selected CTU can be stored, for example, after the selected CTU is coded. For the current coding segment (e.g., the current slice), according to a position of the current coding segment, such as the top-left position of the first coding unit (e.g., the first block) of the current coding segment in the current picture (1502), the current coding segment can be mapped to a region of the multiple regions in the previous picture (1501) and the initial context states of the current coding segment can be determined based on the associated context states from the region of the multiple regions.

Referring to FIG. 15, the current picture (1502) includes multiple independently codable coding segments, such as slices. The current picture (1502) can include multiple regions (e.g., five regions), such as a top-left region (1511), a top-right region (1512), a bottom-left region (1513), a bottom-right region (1514), and a center region (1515). In an example, the five regions (1511)-(1515) are not overlapped. In an example, the five regions (1511)-(1515) covers the entire picture (1502). An independently codable coding segment, such as a slice, in the current picture (1502) is to be coded. To initialize context state(s) for the independently codable coding segment in the current picture (1502), a corresponding region or a location in the previous picture (1501) can be determined based on a location of the independently codable coding segment in the current picture (1502). In an example, the location of the independently codable coding segment is indicated by the top-left position of the first coding unit (e.g., the first block) of the current coding segment. For example, if the independently codable coding segment is in the region (1511) in the current picture (1502), the corresponding region in the previous picture (1501) is the top-left region in the previous picture (1501), and the corresponding CTU 1 that is within the top-left region in the previous picture (1501) can be selected. Accordingly, the stored probability information (e.g., the stored context states) associates with the CTU 1 can be used to determine the initial probability information of the independently codable coding segment in the region (1511). The above descriptions can be adapted if the independently codable coding segment is located in another region (e.g., one of (1512)-(1515)).

In the example, the context states of the syntax element(s) at the five positions (e.g., the top-left CTU 1, the top-right CTU 2, the bottom-left CTU 3, the bottom-right CTU 4, and the center CTU 5) are recorded or stored. A position (e.g., the CTU 5) can be referred to when the selected CTU (e.g., the CTU 5) has been coded. For example, the context states of the syntax element(s) at the CTU 5 can be used to initialize the current coding segment in the current picture (1502). According to the position of a current coding block at the beginning of each slice in the current picture, one of the positions is selected for the CABAC context state initialization.

Alternatively, the selection of the location in the previous picture (1501) from which the context state is used in the initialization process can be signaled for the independently codable coding segment (e.g., the current slice) in the current picture (1502). For example, an index pointing to one of the multiple candidate positions (e.g., CTU1 to CTU 5) is signaled.

Comparing the initialization process in FIGS. 14-15, the initial probability information is FIG. 15 is adaptive to specific information of the current coding segment that is independently codable. The specific information of the current coding segment can include a QP of the current coding segment, a location of the current coding segment, and/or the like. Thus, the initial probability information is determined from the previous probability information of a region that matches the specific information (e.g., the QP, the location, and/or the like) of the current coding segment. On the contrary, the initial probability information is FIG. 14 obtained from the previous probability information of a fixed location, and is not adaptive to the specific information of the current coding segment. In various embodiments, the adaptive initialization process in FIG. 15 can make the entropy coding process more efficient. For each independently codable coding segment (e.g., each slice), for example, in the current picture (1502), a control flag can be signaled to select the context initialization scheme used for the respective independently codable coding segment (e.g., the respective slice). In an example, when the flag is zero, the context states of the independently codable coding segment can be initialized using an existing context initialization table, such as a pre-defined tables for a slice type (e.g., one of the initial state tables pre-defined for I-, B- and P-slice types). Otherwise (e.g., when the flag is 1), the context states of the independently codable coding segment can be initialized based on the stored context states from the previously coded coding segment (e.g., the previously coded slice), such as by coping the stored context states from the previously coded slice.

Figure 16:
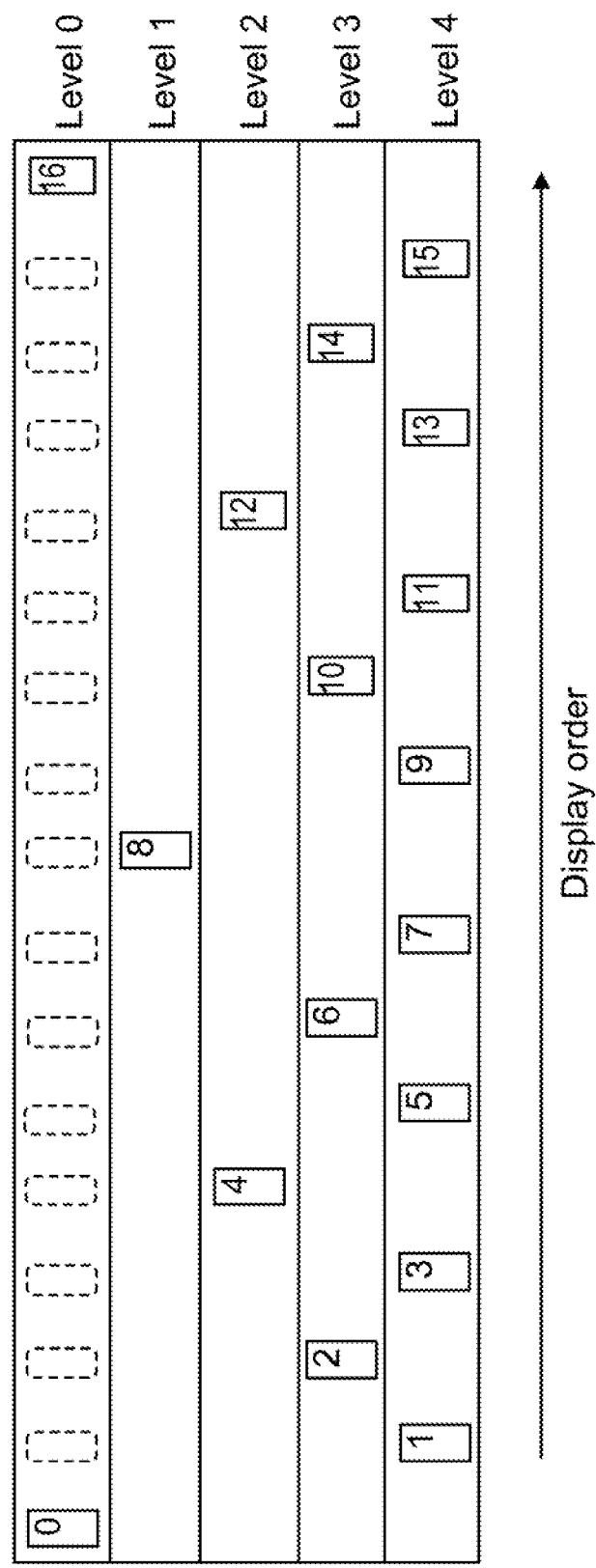
FIG. 16 shows an example of a hierarchical temporal structure.

FIG. 16 shows an example of a hierarchical temporal structure or a hierarchical temporal coding structure for inter coding. Pictures 0-15 (P0-P15 for short) are shown in FIG. 16. A display order is from P0 to P15. Numbers associated with pictures are in the display order.

Pictures at a lower level (e.g., a level 0) are coded prior to pictures at a higher level (e.g., one of levels 1-4). A picture at a level may be used as a reference picture to predict picture(s) at the same level or higher levels.

For a current picture (e.g., (1502)), one or more previously coded pictures can be available as reference picture(s). The selection of a reference picture for CABAC context initialization can be based on a position (e.g., a level) of the current picture in the hierarchical temporal coding structure. In the example of FIG. 16, P0 and P16 are coded first as the level 0 pictures. In an example, P0 is intra coded, and P16 is inter coded (e.g., based on P0). P8 is coded as a level 1 picture with P0 and/or P16 as reference picture(s). For level 2 pictures, P4 can choose P0 and P8 as reference pictures, P12 can choose P8 and P16 as reference pictures, for example, considering both dependency and a distance between a picture to be coded and a respective reference picture. Similar strategies can apply to level 3 and level 4 pictures. In an example, a reference picture is selected from coded picture(s) at a level that is lower than a level of the current picture to be coded. Accordingly, picture(s) at the same level can be coded in parallel and can be discarded (if necessary) without being relied on by other pictures at the same level as a reference picture.

In an embodiment, when selecting a reference picture for context initialization, pictures that are at the same level of the hierarchical temporal coding structure cannot be used as reference pictures for each other. By applying the above restriction, the pictures at the same level can be encoded/decoded in parallel (e.g., at the same time) without dependency on each other. For example, P3 cannot use the context states from P1 for initialization because P1 and P3 are at the same level (e.g., the level 4).

Embodiments described in FIGS. 15-16 can be combined. For example, if the current picture (1502) is at a first level (e.g., the level 3), the previous picture (1501) can be restricted to be at a second level (e.g., one of the levels 0-2) that is lower than the first level.

In an embodiment, instead of or in addition to embodiments described in FIGS. 15-16, quantization information (e.g., a quantization parameter QP) of the previously coded coding segment can be used for context initialization. For example, a QP of the current coding segment can be compared with QPs of the previously coded coding segments, and one of the previously coded coding segments is selected based on the comparison. In an example, the one of the previously coded coding segments is associated with the smallest |QP difference|. The context states of the one of the previously coded coding segments are used to determine the initial probability information of the current coding segment.

In an example, the current coding segment is the current picture (1502). Which picture is selected from previously coded pictures can be determined based on the location of the first block to be coded or the location of the first subblock to be coded in the current picture (1502). Alternatively, which picture is selected from the previously coded pictures can be determined based on a QP of the current picture (1502) and QPs of the previously coded pictures. In an embodiment, which picture is selected from the previously coded pictures can be determined based on the levels of the current picture and the previously coded pictures in the hierarchical temporal structure, as described in FIG. 16. The above embodiments can be combined. For example, P1 (at the level 4) can use P2 (at the level 3) as the reference picture because the level 3 is lower than level 4 and an absolute QP difference |QP difference| between P1 and P2 is the smallest among absolute QP differences between P1 and P6, P10, and P14, respectively.

For each context state, a finite precision can be defined to describe the probability. For example, an 8-bit integer (or an 8-bit state) can be used to indicate probability states ranging from 0 to 255. Quantization can be applied to the selected context states in the coded pictures, such as bit-depth reduction. Accordingly, the stored context states can use less storage space in the memory for prediction purposes. In an example, the stored context states can be stored with a less precision using less bits (e.g., 4-bit instead of 8-bit), and thus keeping only the higher 4 bits of the original 8-bit information for each context. When used for prediction, the lower 4 bits can be filled with zeros. Referring to FIG. 15, the syntax elements of the CTU 1 can be entropy coded with the 8-bit precision and the context states with the 8-bit precision can be obtained based on the entropy coding of the CTU 1. Subsequently, the context states with the 8-bit precision can be stored with 4-bit precision. The 4-bit precision context states can be used to determine the initial probabilities of the current coding segment (e.g., a slice in the current picture (1502)).

Figure 17:
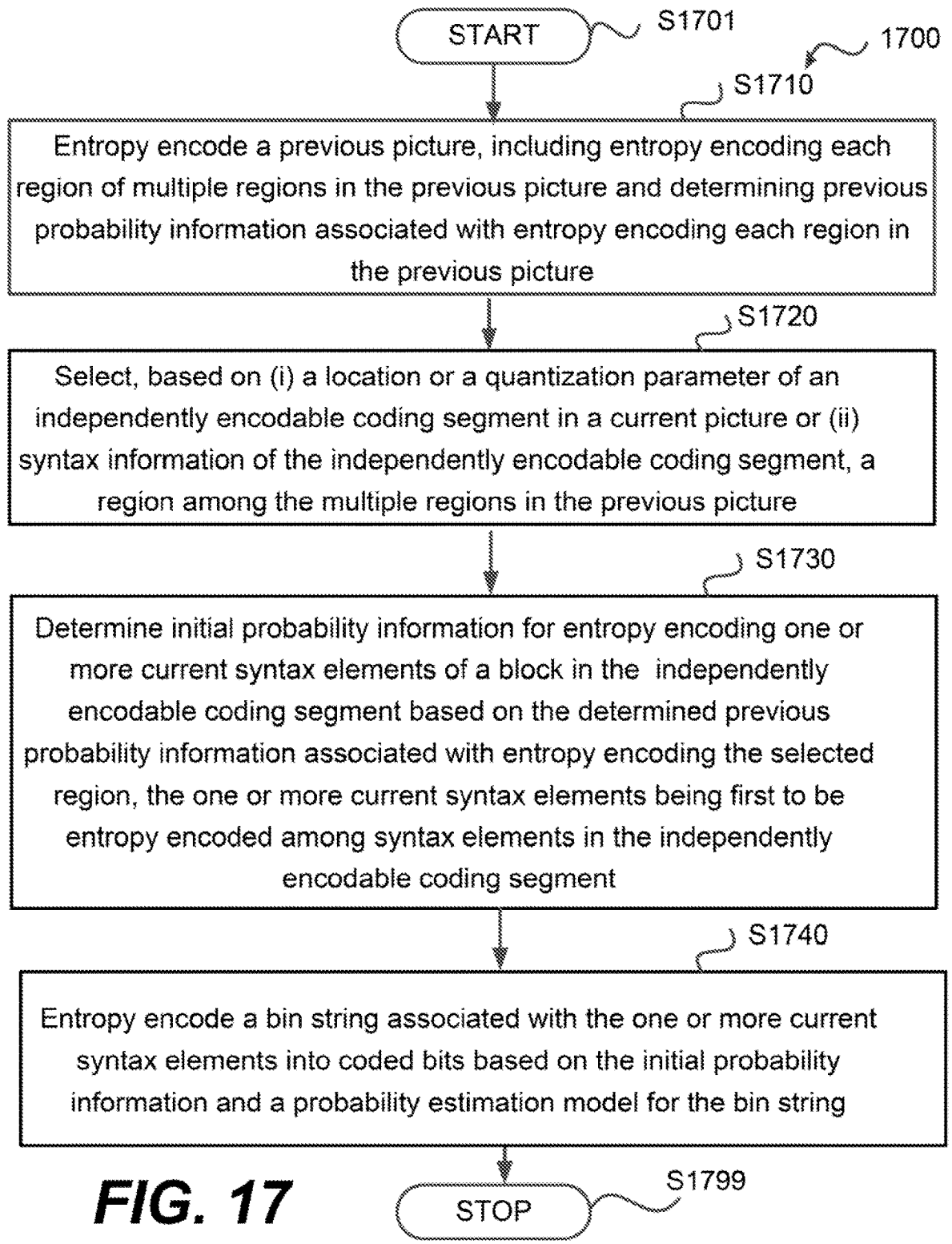
FIG. 17 shows a flow chart outlining an encoding process according to some embodiments of the disclosure.

FIG. 17 shows a flow chart outlining a process (e.g., an encoding process) (1700) according to an embodiment of the disclosure. The process (1700) can be executed by an apparatus for video/image coding that can include processing circuitry. The processing circuitry in the apparatus, such as the processing circuitry in the terminal devices (310), (320), (330) and (340), processing circuitry that performs functions of a video encoder (e.g., (403), (603), (703)), or the like can be configured to execute the process (1700). In some embodiments, the process (1700) is implemented in software instructions, thus when the processing circuitry executes the software instructions, the processing circuitry performs the process (1700). The process starts at (S1701), and proceeds to (S1710).

At (S1710), a previous picture can be entropy encoded. Each region of multiple regions in the previous picture can be entropy encoded. Previous probability information associated with entropy encoding each region in the previous picture can be determined.

At (S1720), based on (i) a location or a quantization parameter of an independently encodable coding segment in a current picture or (ii) syntax information of the independently encodable coding segment, a region can be selected among the multiple regions in the previous picture. The independently encodable coding segment can be the current picture or a region (e.g., a slice) inside the current picture.

At (S1730), initial probability information for entropy encoding one or more current syntax elements of a block in the independently encodable coding segment can be determined based on the determined previous probability information associated with entropy encoding the selected region. The one or more current syntax elements are first to be entropy encoded among syntax elements in the independently encodable coding segment.

The block can be the first block to be entropy encoded among blocks in the independently encodable coding segment.

At (S1740), a bin string associated with the one or more current syntax elements can be entropy encoded into coded bits based on the initial probability information and a probability estimation model for the bin string.

Syntax information that indicates which region among the multiple regions is selected can be encoded and included in a bitstream.

In an example, the syntax information includes an index indicating which region among the multiple regions is selected.

Then, the process (1700) proceeds to (S1799) and terminates.

The process (1700) can be suitably adapted to various scenarios and steps in the process (1700) can be adjusted accordingly. One or more of the steps in the process (1700) can be adapted, omitted, repeated, and/or combined. Any suitable order can be used to implement the process (1700). Additional step(s) can be added.

The independently encodable coding segment can be a slice in the current picture.

In an example, the independently encodable coding segment is the current picture.

In an example, the multiple regions in the previous picture include coding tree units (CTUs) located at four corners and a center of the previous picture, respectively. The current picture includes four corner regions and a center region. A CTU located at one of the four corners of the previous picture can be selected based on the block being located at one of the four corner regions of the current picture. A CTU located at the center of the previous picture can be selected based on the block being located at the center region in the current picture. The region includes the CTU located at the one of the four corners of the previous picture or the CTU located at the center of the previous picture.

In an example, one or more parameters in the probability estimation model can be obtained based on a probability estimation model used to entropy encode the selected region. Examples of the probability estimation model are described in Eqs. (2)-(5).

In an example, the one or more parameters include adaptation rates and adaptive weights associated with multiple probability estimates of the bin string, such as described in Eqs. (2)-(5). Each of the adaptation rates associated with a respective probability estimate indicates a quantization step size (e.g., a difference $\Delta p$ between two adjacent probability states) between two adjacent probabilities for the bin string.

In an example, the previous picture is selected from multiple pictures in the bitstream such that a first level in a hierarchical temporal structure associated with the previous picture is lower than a second level in the hierarchical temporal structure associated with the current picture. Each picture at the first level has been decoded prior to decoding each of one or more pictures at the second level.

In an example, the determined previous probability information is stored with a first quantization precision (e.g., a 4-bit precision) that is lower than a second quantization precision (e.g., an 8-bit precision) of the determined previous probability information used to entropy decode each region in the previous picture. The initial probability information can be determined based on the stored determined previous probability information with the first quantization precision.

In an example, a flag in the bitstream indicates that the initial probability information is to be determined based on the determined previous probability information from the previous picture.

In an example, the probability estimation model is a context-adaptive model. The coded bits can be entropy encoded with context-adaptive binary arithmetic coding (CABAC).

Figure 18:
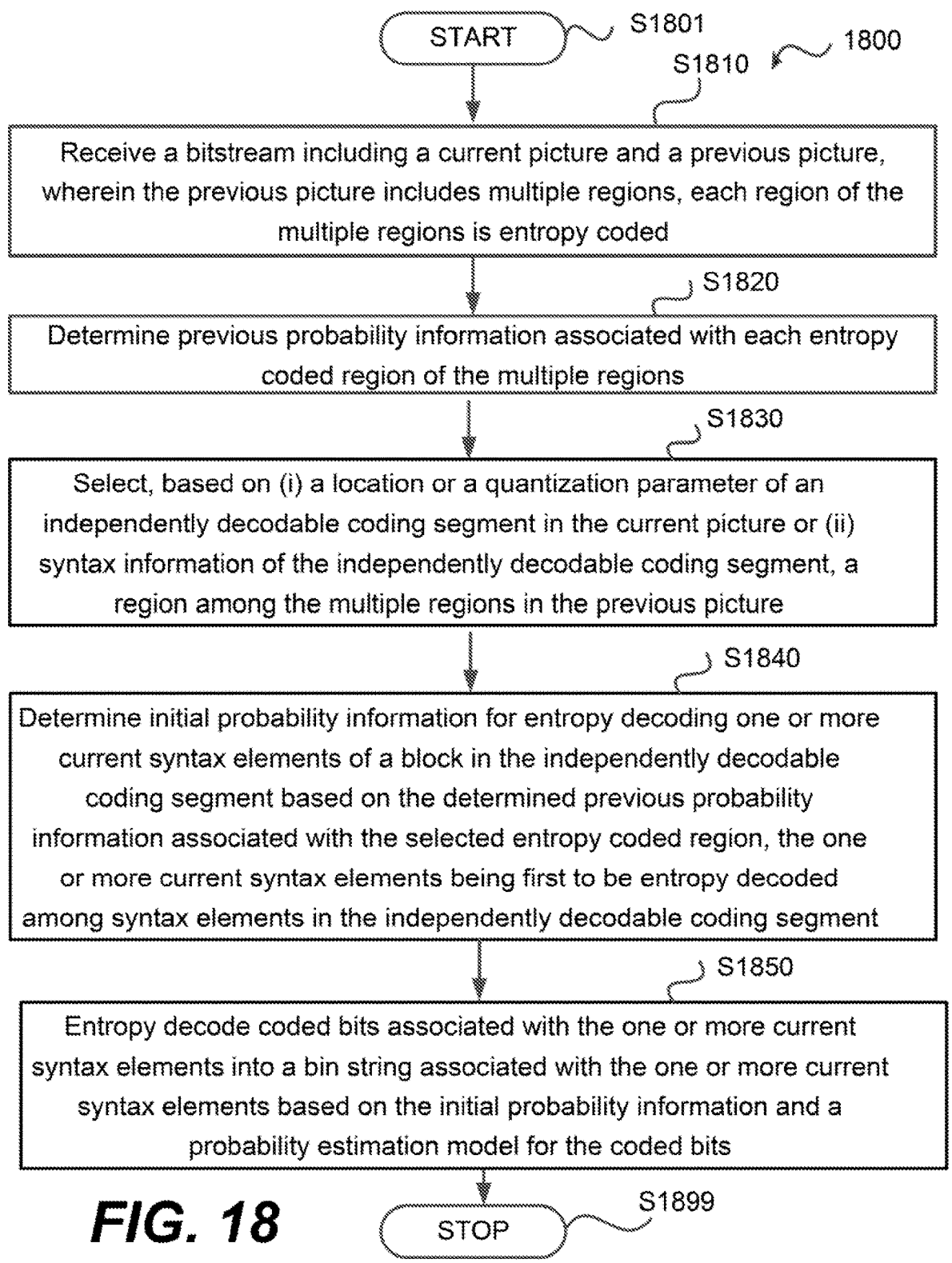
FIG. 18 shows a flow chart outlining a decoding process according to some embodiments of the disclosure.

FIG. 18 shows a flow chart outlining a process (e.g., a decoding process) (1800) according to an embodiment of the disclosure. The process (1800) can be used in a video/image decoder. The process (1800) can be executed by an apparatus for video/image coding that can include receiving circuitry and processing circuitry. The processing circuitry in the apparatus, such as the processing circuitry in the terminal devices (310), (320), (330) and (340), the processing circuitry that performs functions of the video decoder (410), the processing circuitry that performs functions of the video decoder (510), and the like can be configured to execute the process (1800). In some examples, the process (1800) is used in a video encoder (e.g., the video encoder (403), the video encoder (603)). In an example, the process (1800) is executed by processing circuitry that performs functions of a video encoder (e.g., the video encoder (403), the video encoder (603)). In some embodiments, the process (1800) is implemented in software instructions, thus when the processing circuitry executes the software instructions, the processing circuitry performs the process (1800). The process starts at (S1801) and proceeds to (S1810).

At (S1810), a bitstream including a current picture and a previous picture is received. The previous picture can include multiple regions. Each region of the multiple regions can be entropy coded.

At (S1820), previous probability information associated with each entropy coded region of the multiple regions in the previous picture are determined.

At (S1830), based on (i) a location or a quantization parameter of an independently decodable coding segment in the current picture or (ii) syntax information of the independently decodable coding segment, a region can be selected among the multiple regions in the previous picture. The independently decodable coding segment can be (i) the current picture or (ii) a region (e.g., a slice) inside the current picture.

The independently decodable coding segment can be a slice in the current picture. In an example, the independently decodable coding segment is one of an intra slice (I-slice), a bi-predictive slice (a B-slice), and a predictive slice (a P-slice) in the current picture.

In an example, the independently decodable coding segment is the current picture. The region can be selected based on the syntax information that indicates which region among the multiple regions is selected.

In an example, the syntax information includes an index indicating which region among the multiple regions is selected.

In an example, the multiple regions in the previous picture include coding tree units (CTUs) located at four corners and a center of the previous picture, respectively. The current picture includes four corner regions and a center region. A CTU located at one of the four corners of the previous picture can be selected based on the block being located at one of the four corner regions of the current picture. A CTU located at the center of the previous picture can be selected based on the block being located at the center region in the current picture. The region includes the CTU located at the one of the four corners of the previous picture or the CTU located at the center of the previous picture.

At (S1840), initial probability information for entropy decoding one or more current syntax elements of a block in the independently decodable coding segment can be determined based on the determined previous probability information associated with entropy decoding the selected region. The one or more current syntax elements are first to be entropy decoded among syntax elements in the independently decodable coding segment.

The block can be the first block to be entropy decoded among blocks in the independently decodable coding segment.

At (S1850), coded bits associated with the one or more current syntax elements can be entropy decoded into a bin string associated with the one or more current syntax elements based on the initial probability information and a probability estimation model for the coded bits.

Then, the process (1800) proceeds to (S1899) and terminates.

The process (1800) can be suitably adapted to various scenarios and steps in the process (1800) can be adjusted accordingly. One or more of the steps in the process (1800) can be adapted, omitted, repeated, and/or combined. Any suitable order can be used to implement the process (1800). Additional step(s) can be added.

In an example, one or more parameters in the probability estimation model can be obtained based on a probability estimation model used to entropy decode the selected region. Examples of the probability estimation model are described in Eqs. (2)-(5).

In an example, the one or more parameters include adaptation rates and adaptive weights associated with multiple probability estimates of the bin string, such as described in Eqs. (2)-(5). Each of the adaptation rates associated with a respective probability estimate indicates a quantization step size (e.g., a difference $\Delta p$ between two adjacent probability states) between two adjacent probabilities for the bin string.

In an example, the previous picture is selected from multiple pictures in the bitstream such that a first level in a hierarchical temporal structure associated with the previous picture is lower than a second level in the hierarchical temporal structure associated with the current picture. Each picture at the first level has been decoded prior to decoding each of one or more pictures at the second level.

In an example, the determined previous probability information is stored with a first quantization precision (e.g., a 4-bit precision) that is lower than a second quantization precision (e.g., an 8-bit precision) of the determined previous probability information used to entropy decode each region in the previous picture. The initial probability information can be determined based on the stored determined previous probability information with the first quantization precision.

In an example, a flag in the bitstream indicates that the initial probability information is to be determined based on the determined previous probability information from the previous picture.

In an example, the probability estimation model is a context-adaptive model. The coded bits can be entropy decoded with context-adaptive binary arithmetic coding (CABAC).

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 19 shows a computer system (1900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
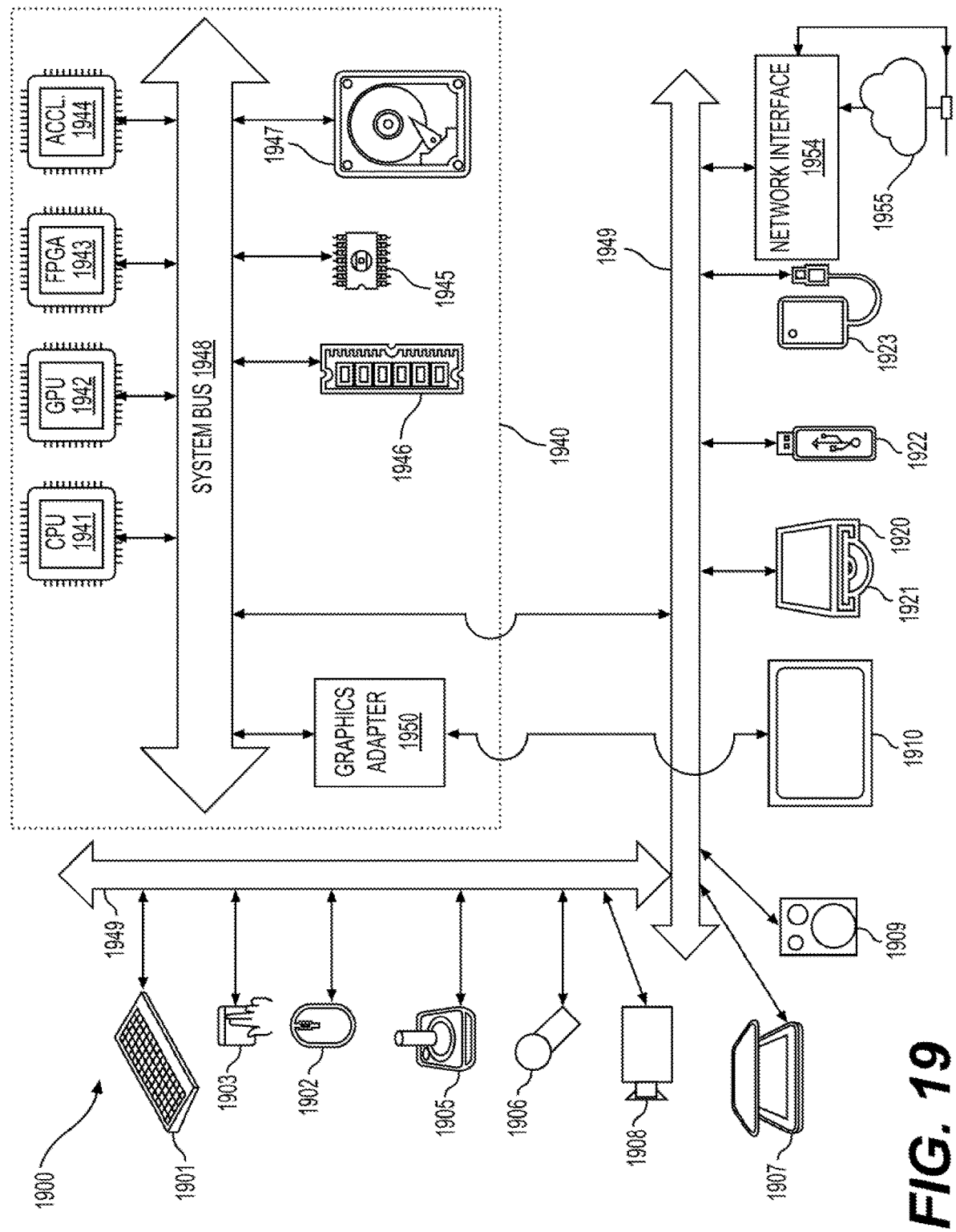
FIG. 19 is a schematic illustration of a computer system in accordance with an embodiment.

The components shown in FIG. 19 for computer system (1900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1900).

Computer system (1900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1901), mouse (1902), trackpad (1903), touch screen (1910), data-glove (not shown), joystick (1905), microphone (1906), scanner (1907), camera (1908).

Computer system (1900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1910), data-glove (not shown), or joystick (1905), but there can also be tactile feedback devices that do not serve as input devices), audio output devices (such as: speakers (1909), headphones (not depicted)), visual output devices (such as touch-screens (1910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1900) can also include human accessible storage devices and their associated media such as optical media including CD/DVD ROM/RW (1920) with CD/DVD or the like media (1921), thumb-drive (1922), removable hard drive or solid state drive (1923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1900) can also include an interface (1954) to one or more communication networks (1955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1949) (such as, for example USB ports of the computer system (1900)); others are commonly integrated into the core of the computer system (1900) by attachment to a system bus as described below (for example Ethernet interface into a PC computer system or cellular network interface into a smartphone computer system). Using any of these networks, computer system (1900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1940) of the computer system (1900).

The core (1940) can include one or more Central Processing Units (CPU) (1941), Graphics Processing Units (GPU) (1942), specialized programmable processing units in the form of Field Programmable Gate Areas (FPGA) (1943), hardware accelerators (1944) for certain tasks, graphics adapters (1950), and so forth. These devices, along with Read-only memory (ROM) (1945), Random-access memory (1946), internal mass storage (1947) such as internal non-user accessible hard drives, SSDs, and the like, may be connected through a system bus (1948). In some computer systems, the system bus (1948) can be accessible in the form of one or more physical plugs to enable extensions by additional CPUs, GPU, and the like. The peripheral devices can be attached either directly to the core's system bus (1948), or through a peripheral bus (1949). In an example, the touch-screen (1910) can be connected to the graphics adapter (1950). Architectures for a peripheral bus include PCI, USB, and the like.

CPUs (1941), GPUs (1942), FPGAs (1943), and accelerators (1944) can execute certain instructions that, in combination, can make up the aforementioned computer code. That computer code can be stored in ROM (1945) or RAM (1946). Transitional data can also be stored in RAM (1946), whereas permanent data can be stored for example, in the internal mass storage (1947). Fast storage and retrieve to any of the memory devices can be enabled through the use of cache memory, that can be closely associated with one or more CPU (1941), GPU (1942), mass storage (1947), ROM (1945), RAM (1946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (1900) having architecture, and specifically the core (1940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1940) that are of non-transitory nature, such as core-internal mass storage (1947) or ROM (1945). The software implementing various embodiments of the present disclosure can be stored in such devices and executed by core (1940). A computer-readable medium can include one or more memory devices or chips, according to particular needs. The software can cause the core (1940) and specifically the processors therein (including CPU, GPU, FPGA, and the like) to execute particular processes or particular parts of particular processes described herein, including defining data structures stored in RAM (1946) and modifying such data structures according to the processes defined by the software. In addition or as an alternative, the computer system can provide functionality as a result of logic hardwired or otherwise embodied in a circuit (for example: accelerator (1944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A

Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
CCLM: combine cross-component linear model While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of decoding in a decoder, comprising:
receiving a video bitstream including a current picture and a previous picture, wherein the previous picture comprises multiple regions, each region of the multiple regions in the previous picture being entropy coded, the multiple regions in the previous picture including coding tree units (CTUs) located at four corners and a center of the previous picture, respectively, the current picture including four corner regions and a center region;
determining previous probability information associated with each region of the multiple regions in the previous picture, the previous probability information being determined with a second quantization precision;
storing the previous probability information with a first quantization precision that is lower than the second quantization precision, the first quantization precision having less bits than the second quantization precision;
selecting, based on a location of an independently decodable coding segment that is a region in the current picture, one of the multiple regions in the previous picture by one of:
selecting a CTU located at one of the four corners of the previous picture when a block in the independently decodable coding segment is located at one of the four corner regions of the current picture, the CTU located at the one of the four corners being in the selected one of the multiple regions, and
selecting a CTU located at the center of the previous picture when the block in the independently decodable coding segment is located at the center region in the current picture, the CTU located at the center being in the selected one of the multiple regions;
determining initial probability information for entropy decoding one or more current syntax elements of the block in the independently decodable coding segment in the current picture based on the stored previous probability information that has the first quantization precision and is associated with the selected one of the multiple regions in the previous picture, the one or more current syntax elements being first to be entropy decoded among syntax elements in the independently decodable coding segment in the current picture; and
entropy decoding coded bits associated with the one or more current syntax elements into a bin string associated with the one or more current syntax elements based on the initial probability information and a probability estimation model for the coded bits, wherein
a flag in the video bitstream indicates that the initial probability information is to be determined based on the stored previous probability information from the previous picture.

2. The method of claim 1, wherein the independently decodable coding segment is one of an intra slice (I-slice), a bi-predictive slice (a B-slice), and a predictive slice (a P-slice) in the current picture.

3. The method of claim 1, comprising:
obtaining one or more parameters in the probability estimation model based on a probability estimation model used to entropy decode the selected region one of the multiple regions.

4. The method of claim 1, comprising:
obtaining adaptation rates and adaptive weights in the probability estimation model based on a probability estimation model used to entropy decode the selected one of the multiple regions, the adaptation rates and the adaptive weights being associated with multiple probability estimates of the bin string, each of the adaptation rates associated with a respective probability estimate indicating a quantization step size between two adjacent probabilities for the bin string.

5. The method of claim 1, further comprising:
selecting the previous picture from multiple pictures in the video bitstream such that a first level in a hierarchical temporal structure associated with the previous picture is lower than a second level in the hierarchical temporal structure associated with the current picture, each picture at the first level having been decoded prior to decoding each of one or more pictures at the second level.

6. The method of claim 1, wherein
the probability estimation model is a context-adaptive model; and
the entropy decoding includes entropy decoding the coded bits with context-adaptive binary arithmetic coding (CABAC).

7. An apparatus for encoding, comprising:
processing circuitry configured to:
determine previous probability information associated with each region of multiple regions in a previous picture, the previous probability information being determined with a second quantization precision, each region of the multiple regions in the previous picture being entropy coded, the multiple regions in the previous picture including coding tree units (CTUs) located at four corners and a center of the previous picture, respectively;
store the previous probability information with a first quantization precision that is lower than the second quantization precision, the first quantization precision having less bits than the second quantization precision;
select, based on a location of an independently decodable coding segment that is a region in a current picture including four corner regions and a center region, one of the multiple regions in the previous picture by one of:
selecting a CTU located at one of the four corners of the previous picture when a block in the independently decodable coding segment is located at one of the four corner regions of the current picture, the CTU located at the one of the four corners being in the selected one of the multiple regions, and
selecting a CTU located at the center of the previous picture when based the block in the independently decodable coding segment is located at the center region in the current picture, the CTU located at the center being in the selected region one of the multiple regions;
determine initial probability information for entropy encoding one or more current syntax elements of the block in the independently decodable coding segment in the current picture based on the stored previous probability information that has the first quantization precision and is associated with the selected one of the multiple regions in the previous picture, the one or more current syntax elements being first to be entropy encoded among syntax elements in the independently decodable coding segment in the current picture;
entropy encode a bin string associated with the one or more current syntax elements into encoded bits associated with the one or more current syntax elements based on the initial probability information and a probability estimation model for the bin string, and
signal a flag in a video bitstream indicating that the initial probability information is to be determined based on the stored previous probability information from the previous picture.

8. The apparatus of claim 7, wherein the independently decodable coding segment is one of an intra slice (I-slice), a bi-predictive slice (a B-slice), and a predictive slice (a P-slice) in the current picture.

9. The apparatus of claim 7, wherein the processing circuitry is configured to:
obtain one or more parameters in the probability estimation model based on a probability estimation model used for the selected one of the multiple regions in the previous picture.

10. The apparatus of claim 7, wherein the processing circuitry is configured to:
obtain adaptation rates and adaptive weights in the probability estimation model based on a probability estimation model for the selected one of the multiple regions in the previous picture, the adaptation rates and the adaptive weights being associated with multiple probability estimates of the bin string, each of the adaptation rates associated with a respective probability estimate indicating a quantization step size between two adjacent probabilities for the bin string.

11. The apparatus of claim 7, wherein the processing circuitry is configured to:
select the previous picture from multiple pictures such that a first level in a hierarchical temporal structure associated with the previous picture is lower than a second level in the hierarchical temporal structure associated with the current picture, each picture at the first level having been encoded prior to encoding each of one or more pictures at the second level.

12. A non-transitory computer-readable storage medium storing a video bitstream that is generated by a video encoding method, the video encoding method comprising:
determining previous probability information associated with each region of multiple regions in a previous picture, the previous probability information being determined with a second quantization precision, each region of the multiple regions in the previous picture being entropy coded, the multiple regions in the previous picture including coding tree units (CTUs) located at four corners and a center of the previous picture, respectively;
storing the previous probability information with a first quantization precision that is lower than the second quantization precision, the first quantization precision having less bits than the second quantization precision;
selecting, based on a location of an independently decodable coding segment that is a region in a current picture including four corner regions and a center region, one of the multiple regions in the previous picture by one of:
selecting a CTU located at one of the four corners of the previous picture when a block in the independently decodable coding segment is located at one of the four corner regions of the current picture, the CTU located at the one of the four corners being in the selected one of the multiple regions, and
selecting a CTU located at the center of the previous picture when the block in the independently decodable coding segment is located at the center region in the current picture, the CTU located at the center being in the selected one of the multiple regions;
determining initial probability information for entropy encoding one or more current syntax elements of the block in the independently decodable coding segment in the current picture based on the stored previous probability information that has the first quantization precision and is associated with the selected one of the multiple regions in the previous picture, the one or more current syntax elements being first to be entropy encoded among syntax elements in the independently decodable coding segment in the current picture;

entropy encoding a bin string associated with the one or more current syntax elements into encoded bits associated with the one or more current syntax elements based on the initial probability information and a probability estimation model for the bin string, and signalling a flag in the video bitstream indicating that the initial probability information is to be determined based on the stored previous probability information from the previous picture.

\* \* \* \* \*